United States Patent
Tsuji et al.

(10) Patent No.: US 11,312,838 B2
(45) Date of Patent: Apr. 26, 2022

(54) FLAME RETARDANT COMPOSITION AND FLAME-RETARDANT THERMOPLASTIC RESIN COMPOSITION CONTAINING SAID FLAME RETARDANT COMPOSITION

(71) Applicant: DAIHACHI CHEMICAL INDUSTRY CO., LTD., Osaka (JP)

(72) Inventors: Hiroshi Tsuji, Higashiosaka (JP); Kazuo Fujimoto, Higashiosaka (JP)

(73) Assignee: DAIHACHI CHEMICAL INDUSTRY CO., LTD., Osaka (JP)

( * ) Notice: Subject to any disclaimer, the term of this patent is extended or adjusted under 35 U.S.C. 154(b) by 0 days.

(21) Appl. No.: 16/762,892

(22) PCT Filed: Oct. 11, 2018

(86) PCT No.: PCT/JP2018/037966
§ 371 (c)(1),
(2) Date: May 8, 2020

(87) PCT Pub. No.: WO2019/093066
PCT Pub. Date: May 16, 2019

(65) Prior Publication Data
US 2021/0171735 A1   Jun. 10, 2021

(30) Foreign Application Priority Data

Nov. 10, 2017 (JP) .............................. JP2017-217499
Mar. 30, 2018 (JP) .............................. JP2018-068371

(51) Int. Cl.
| | |
|---|---|
| C08K 5/5399 | (2006.01) |
| C08F 10/06 | (2006.01) |
| C08K 3/22 | (2006.01) |
| C08K 3/32 | (2006.01) |
| C08K 5/521 | (2006.01) |
| C08K 5/5313 | (2006.01) |
| C08K 13/02 | (2006.01) |
| C08L 23/12 | (2006.01) |
| C09K 21/04 | (2006.01) |
| C09K 21/10 | (2006.01) |
| C09K 21/12 | (2006.01) |
| C08L 23/02 | (2006.01) |
| C08K 5/3492 | (2006.01) |

(52) U.S. Cl.
CPC ............ *C08K 5/5399* (2013.01); *C08F 10/06* (2013.01); *C08K 3/22* (2013.01); *C08K 3/32* (2013.01); *C08K 5/34922* (2013.01); *C08K 5/34928* (2013.01); *C08K 5/521* (2013.01); *C08K 5/5313* (2013.01); *C08K 13/02* (2013.01); *C08L 23/02* (2013.01); *C08L 23/12* (2013.01); *C09K 21/04* (2013.01); *C09K 21/10* (2013.01); *C09K 21/12* (2013.01); *C08K 2003/2296* (2013.01); *C08K 2201/014* (2013.01); *C08L 2201/02* (2013.01)

(58) Field of Classification Search
CPC .............. C08K 5/34928; C08K 5/5399; C08K 5/34922; C08L 23/00
See application file for complete search history.

(56) References Cited

U.S. PATENT DOCUMENTS

| | | | |
|---|---|---|---|
| 3,817,881 | A | 6/1974 | Turley |
| 3,867,320 | A | 2/1975 | Gambardella et al. |
| 3,887,655 | A | 6/1975 | Shim |

(Continued)

FOREIGN PATENT DOCUMENTS

| | | | | |
|---|---|---|---|---|
| CN | 1324381 A | * | 11/2001 | ........... C08K 5/5399 |
| CN | 101608348 A | | 12/2009 | |

(Continued)

OTHER PUBLICATIONS

SciFinder Abstract for CN 104861302 (2015, 1 page).*

(Continued)

*Primary Examiner* — Brieann R Johnston
(74) *Attorney, Agent, or Firm* — Seed IP Law Group LLP

(57) ABSTRACT

The present invention provides a non-halogen-based flame retardant composition and flame retardant resin composition wherein a small amount of addition achieves an excellent flame retardancy, an amount of elution of a flame retardant from the thermoplastic resin is extremely small even under high temperature and high humidity, and it has water-resistant property. A phosphate ester amide compound of general formula (I), a nitrogen-containing compound having a 1,3,5-triazine structure or 1,3,5-triazine fused ring structure, and optionally, a metal oxide or metal salt are used together. Further optionally, a dripping inhibitor is blended.

General formula (I)

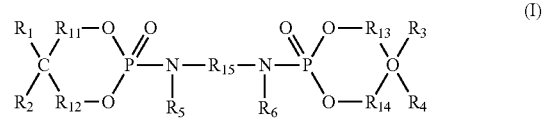

wherein, $R_1$, $R_2$, $R_3$ and $R_4$ are each independently hydrogen or $C_{1-3}$ alkyl, $R_{11}$, $R_{12}$, $R_{13}$ and $R_{14}$ are each independently $C_{1-3}$ alkylene, $R_{15}$ is $C_{1-6}$ alkylene, and $R_5$ and $R_6$ are each independently hydrogen or $C_{1-6}$ alkyl.

18 Claims, No Drawings

(56) References Cited

U.S. PATENT DOCUMENTS

| | | | |
|---|---|---|---|
| 6,221,939 B1 * | 4/2001 | Campbell | C08K 5/5399 524/117 |
| 6,727,335 B2 | 4/2004 | Sicken et al. | |
| 9,988,510 B2 | 6/2018 | Ono et al. | |
| 2003/0088000 A1 | 5/2003 | Kimura et al. | |
| 2003/0109608 A1 | 6/2003 | Worku et al. | |
| 2013/0181157 A1 | 7/2013 | Guo et al. | |
| 2015/0087736 A1 * | 3/2015 | Peters | C08G 18/14 521/156 |
| 2015/0197624 A1 | 7/2015 | Ueki et al. | |
| 2016/0244582 A1 | 8/2016 | Ono et al. | |

FOREIGN PATENT DOCUMENTS

| | | | | |
|---|---|---|---|---|
| CN | 102179024 B | * | 6/2012 | A62D 1/06 |
| CN | 104411756 A | | 3/2015 | |
| CN | 104861302 A | | 8/2015 | |
| CN | 105086287 A | | 11/2015 | |
| CN | 105683337 A | | 6/2016 | |
| DE | 10317487 A1 | * | 1/2004 | C08K 5/5313 |
| JP | 49-43272 A | | 11/1974 | |
| JP | 50-17463 A | | 2/1975 | |
| JP | 56-36512 A | | 4/1981 | |
| JP | 11-1612 A | | 1/1999 | |
| JP | 2003-226818 A | | 8/2003 | |
| JP | 2005-162912 A | | 6/2005 | |
| JP | 2011-148936 A | | 8/2011 | |
| JP | 2013-541362 A | | 11/2013 | |
| WO | 2008/085926 | | 7/2008 | |
| WO | 2014/002958 | | 1/2014 | |

OTHER PUBLICATIONS

Google patents translation for DE 10317487 (2004, 21 pages).*
Office Action (w/ English Translation), dated Mar. 4, 2021, for Chinese Application No. 201880073010.4. (22 pages).
Supplementary European Search Report, dated Feb. 25, 2021, for European Application No. 18876375.9. (6 pages).

* cited by examiner

FLAME RETARDANT COMPOSITION AND FLAME-RETARDANT THERMOPLASTIC RESIN COMPOSITION CONTAINING SAID FLAME RETARDANT COMPOSITION

TECHNICAL FIELD

The present invention is related to a flame retardant composition and a flame retardant thermoplastic resin composition comprising a flame retardant composition, as well as a non-halogen-based flame retardant thermoplastic resin composition having an excellent flame retardancy and excellent water-resistant property. The flame retardant composition and flame retardant thermoplastic resin composition of the present invention can be used for molded products such as an automobile upholstery, a packaging material, a material for electrical devices, a sheet or film for building materials, a material covering electric wire and the like.

BACKGROUND ART

A thermoplastic resin has been used in a wide variety of fields, such as automotive parts, housings for electric equipments, electric insulating materials, packaging films, building materials, floor materials, and the like. This is from the viewpoints that it is easy to mold a thermoplastic resin, the number of steps for molding a thermoplastic resin is small, and molded products of a thermoplastic resin can be recycled. In addition, although most thermoplastic resins are flammable, there are actually many cases where it is desired to use a thermoplastic resin to produce a molded product for a use in which a flame retardancy is required. Therefore, in order to provide a flame retardancy to a thermoplastic resin, flame retardants such as a halogen-based flame retardant, a metal hydroxide such as aluminum hydroxide or magnesium hydroxide, red phosphorus which has been subjected to a coating treatment or the like, a polyphosphate salt such as ammonium polyphosphate, an aromatic organic phosphate ester, and a triazine-based compound such as melamine have been used.

However, a halogen-based flame retardant has a problem in that when a molded product containing it is discarded and incinerated, smoke and harmful gasses are generated. In addition, when a metal hydroxide is used as a flame retardant, it is necessary to add a very large amount. Therefore, it is likely to cause deterioration in the physical properties of the thermoplastic resin.

As a flame retardant containing no halogen, Japanese Laid-open Publication No. 2003-26935 attempts to provide a flame retardancy to a polyolefin resin by a combination of two types of phosphate salts such as a piperazine salt of poly(pyro)phosphoric acid, and melamine poly(pyro)phosphate. In addition, Japanese Laid-open Publication No. 2011-148936 discloses a flame retardant resin composition which uses a combination of a polyphosphoric acid piperazine salt and melamine cyanurate. However, in both compositions, in order to achieve a high flame retardancy, it is necessary to increase the ratio of the poly(pyro)phosphoric acid piperazine salt in the combination, and the poly(pyro) phosphoric acid piperazine salt exhibits water solubility. Therefore, the resin compositions comprising such a flame retardant have problems in that the water-resistant property is deteriorated, and it is difficult to use in an environment where a humidity is high or in a use where the compositions contact with water. For such reasons, a surface coating or microencapsulation of polyphosphate salts which are likely to be eluted into water is described. However, still it cannot be said that the water-resistant property is sufficient. In addition, due to the costs of the process for the surface coating or microencapsulation, the cost for manufacturing a molded product is increased.

US Patent Application Publication No. 2003/0109608 discloses a phosphoramidate compound having a piperazine skeleton. However, it does not disclose the problem of the deterioration of a water-resistant property in a thermoplastic resin composition comprising a flame retardant. In addition, this document specifically describes only that a flame retardancy is provided to a polyester resin. It has not confirmed a high flame retardant effect to the extent that a flame retardancy can be provided to a polyolefin resin to which it is difficult to provide a flame retardancy.

In addition, Japanese Laid-open Publication No. 2003-226818 discloses that a flame retardant such as a double salt of an amino group-containing nitrogen compound and a polyphosphoric acid as well as a flame retardant auxiliary agent such as a phosphorous-containing compound are used in combination to provide a flame retardancy to a resin. However, as described above, it does not disclose the problem of the deterioration of a water-resistant property in a thermoplastic resin composition comprising a flame retardant. In addition, this document specifically describes only that a flame retardancy is provided to a polyester resin. It has not confirmed a high flame retardant effect to the extent that a flame retardancy can be provided to a polyolefin resin to which it is difficult to provide a flame retardancy.

PRIOR ART DOCUMENT

Patent Document

[Patent Document 1] Japanese Laid-open Publication No. 2003-26935
[Patent Document 2] Japanese Laid-open Publication No. 2011-148936
[Patent Document 3] US Patent Application Publication No. 2003/0109608
[Patent Document 4] Japanese Laid-open Publication No. 2003-226818

SUMMARY OF INVENTION

Problems to be Solved by the Invention

In view of the above, a thermoplastic resin composition having a high flame retardant effect and an excellent water-resistant property as well as a non-halogen-based flame retardant which is used for the thermoplastic resin composition have been required.

Means for Solving the Problem

In view of the above-described current status, the present inventors intensively studied. As a result, a phosphate ester amide compound which has a certain structure and a nitrogen-containing compound are used in combination and thereby it is made possible to provide a non-halogen-based flame retardant composition which has a high flame retardant effect and an excellent water-resistant property, and a flame retardant thermoplastic resin composition using it.

That is, according to the present invention, a flame retardant composition is provided wherein the composition is obtained by using a combination of the phosphate ester amide compound represented by general formula (I) as component (A) and the nitrogen-containing compound which has a 1,3,5-triazine structure or a 1,3,5-triazine fused ring structure as component (B), and thereby the above-described problem was solved. In addition, a flame retardant thermoplastic resin composition is provided wherein the composition is obtained by using a thermoplastic resin of component (D), and a combination of the phosphate ester amide compound represented by general formula (I) as component (A) and the nitrogen-containing compound which has a 1,3,5-triazine structure or a 1,3,5-triazine fused ring structure as component (B), and if necessary, as component (C), a metal oxide or a metal salt is added, and in addition, if necessary, as component (E), a dripping inhibitor is blended, and thereby the above-described problem was solved.

Specifically, in accordance with the present invention, for example, the following matters are provided.

(Item 1)

A flame retardant composition comprising component (A) and component (B), wherein, the component (A) is a phosphate ester amide compound represented by the following general formula (I):

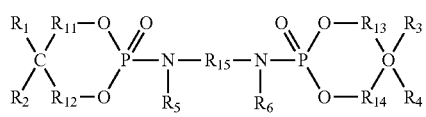

wherein, $R_1$, $R_2$, $R_3$ and $R_4$ are each independently a hydrogen atom or an alkyl group in which the number of carbon atoms is 1 to 3, $R_{11}$, $R_{12}$, $R_{13}$ and $R_{14}$ are each independently an alkylene group in which the number of carbon atoms is 1 to 3, $R_{15}$ is an alkylene group in which the number of carbon atoms is 1 to 6, and $R_5$ and $R_6$ are each independently a hydrogen atom or an alkyl group in which the number of carbon atoms is 1 to 6, and the component (B) is a nitrogen-containing compound having a 1,3,5-triazine structure or a 1,3,5-triazine fused ring structure.

(Item 2)

The flame retardant composition according to above-described item 1, wherein a value of a blending ratio (A)/(B) (mass ratio) of the component (A) and component (B) is larger than 1.

(Item 3)

The flame retardant composition according to above-described item 1 or 2, wherein, in the general formula (I), $R_1$, $R_2$, $R_3$ and $R_4$ are each a methyl group, and $R_{11}$, $R_{12}$, $R_{13}$ and $R_{14}$ are each a methylene group.

(Item 4)

The flame retardant composition according to any one of above-described items 1 to 3, wherein in the general formula (I), $R_{15}$ is an ethylene group.

(Item 5)

The flame retardant composition according to any one of above-described items 1 to 4, wherein in the general formula (I), $R_5$ and $R_6$ are each a hydrogen atom.

(Item 6)

The flame retardant composition according to any one of above-described items 1 to 5, wherein the nitrogen-containing compound of the component (B) is a phosphate salt, pyrophosphate salt or polyphosphate salt of an amine compound having a 1,3,5-triazine structure or a 1,3,5-triazine fused ring structure.

(Item 7)

The flame retardant composition according to above-described item 6, wherein the nitrogen-containing compound of the component (B) is a polyphosphate salt of an amine compound having a 1,3,5-triazine structure or a 1,3,5-triazine fused ring structure.

(Item 8)

The flame retardant composition according to above-described item 6, wherein the nitrogen-containing compound of the component (B) is a pyrophosphate salt of an amine compound having a 1,3,5-triazine structure or a 1,3,5-triazine fused ring structure.

(Item 9)

The flame retardant composition according to above-described item 6, wherein the nitrogen-containing compound of the component (B) is a phosphate salt of an amine compound having a 1,3,5-triazine structure or a 1,3,5-triazine fused ring structure.

(Item 10)

The flame retardant composition according to any one of above-described items 1 to 9, further comprising component (C) which is a metal oxide or a metal salt.

(Item 11)

The flame retardant composition according to above-described item 10, wherein the component (C) is aluminum hypophosphite.

(Item 12)

The flame retardant composition according to above-described item 10, wherein the component (C) is an organic phosphinic acid metal salt, organic diphosphinic acid metal salt or organic polyphosphinic acid metal salt.

(Item 13)

The flame retardant composition according to any one of above-described items 1 to 12, wherein a blending ratio (mass ratio) (A)/(B) of the component (A) and component (B) is 1.3 to 5.

(Item 14)

A flame retardant thermoplastic resin composition comprising the flame retardant composition according to any one of above-described items 1 to 13 and component (D) which is a thermoplastic resin.

(Item 15)

The flame retardant thermoplastic resin composition according to above-described item 14, wherein a total amount of the component (A) and component (B) is 10 parts by mass to 50 parts by mass with respect to 100 parts by mass of a total amount of the component (A) to component (D).

(Item 16)

The flame retardant thermoplastic resin composition according to any one of above-described items 14 to 15, further comprising component (E) which is a dripping inhibitor.

(Item 17)

The flame retardant thermoplastic resin composition according to above-described item 16, wherein the dripping inhibitor of the component (E) is polytetrafluoroethylene.

(Item 18)

The flame retardant thermoplastic resin composition according to any one of above-described items 14 to 17, wherein the thermoplastic resin of the component (D) is a polyolefin resin.

(Item 19)

The flame retardant thermoplastic resin composition according to item 18, wherein the polyolefin resin is polypropylene, polyethylene, or a copolymer comprising propylene or ethylene.

Effect of Invention

In accordance with the present invention, a flame retardant composition which has a high flame retardant effect and an excellent water-resistant property, a flame retardant thermoplastic resin composition which uses it, and a molded product thereof are provided.

EMBODIMENTS FOR CARRYING OUT THE INVENTION

<Flame Retardant Composition>

The flame retardant composition of the present invention comprises a phosphate ester amide compound (component (A)) and a compound which has a 1,3,5-triazine structure or a 1,3,5-triazine fused ring structure (component (B)).

<Component (A)>

The phosphate ester amide compound of component (A) is represented by general formula (I):

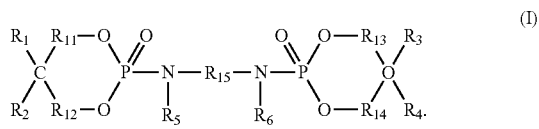

(I)

In the formula, $R_1$, $R_2$, $R_3$ and $R_4$ are each independently a hydrogen atom or an alkyl group in which the number of carbon atoms is 1 to 3, preferably, a hydrogen atom or an alkyl group in which the number of carbon atoms is 1 to 2, and more preferably, a hydrogen atom or a methyl group.

$R_{11}$, $R_{12}$, $R_{13}$ and $R_{14}$ are each independently an alkylene group in which the number of carbon atoms is 1 to 3, preferably an alkylene group in which the number of carbon atoms is 1 to 2, and more preferably, a methylene group.

$R_{15}$ is an alkylene group in which the number of carbon atoms is 1 to 6, preferably, an alkylene group in which the number of carbon atoms is 1 to 4, more preferably, an alkylene group in which the number of carbon atoms is 1 to 3, further preferably, an alkylene group in which the number of carbon atoms is 1 to 2, and particularly preferably, an ethylene group.

$R_5$ and $R_6$ are each independently a hydrogen atom or an alkyl group in which the number of carbon atoms is 1 to 6, preferably, a hydrogen atom or an alkyl group in which the number of carbon atoms is 1 to 3, more preferably, a hydrogen atom or a methyl group, and further preferably, a hydrogen atom.

In the present specification, an alkyl group refers to a monovalent substituent wherein one hydrogen atom is removed from an alkane.

An alkylene group refers to a divalent substituent wherein two hydrogen atoms are removed from an alkane.

Specific examples of the alkyl group in the above-described $R_1$, $R_2$, $R_3$ and $R_4$ include a methyl group, ethyl group, n-propyl group and isopropyl group. Preferable groups are a methyl group and ethyl group, and from the viewpoint of a flame retardancy, a methyl group is particularly preferable.

Specific examples of the alkylene group in the above-described $R_{11}$, $R_{12}$, $R_{13}$ and $R_{14}$ include a methylene group, ethylene group, n-propylene group and 1,2-propylene group. Among these, a methylene group and ethylene group are preferable, and from the viewpoints of a stability and a flame retardancy, a methylene group is particularly preferable.

Specific examples of the alkyl group in $R_5$ and $R_6$ include a methyl group, ethyl group, n-propyl group, isopropyl group, n-butyl group, isobutyl group, tert-butyl group, n-pentyl group, n-hexyl group and the like. Among these, a methyl group and ethyl group are preferable, and from the viewpoint of a flame retardancy, a methyl group is particularly preferable.

Specific examples of the alkylene group in $R_{15}$ include a methylene group, ethylene group, n-propylene group and 1,2-propylene group, n-butylene group, 1,1-dimethylethylene group, n-pentylene group, n-hexylene group and the like. Among these, a methylene group, ethylene group, n-propylene group and 1,2-propylene group, n-butylene group, and 1,1-dimethyl ethylene group are preferable, and from the viewpoint of a flame retardancy, a methylene group and ethylene group are more preferable, and an ethylene group is particularly preferable.

Specific examples of the compounds represented by the general formula (I) include the compounds of the following formulas (1) to (11) and the like.

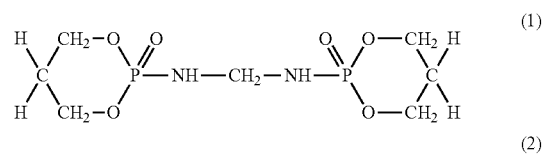

(1)

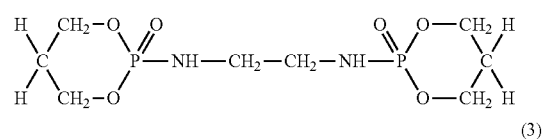

(2)

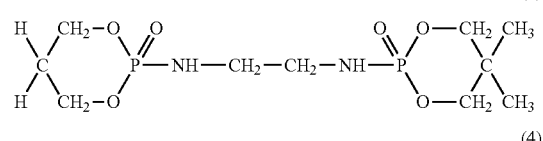

(3)

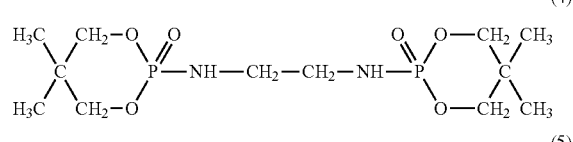

(4)

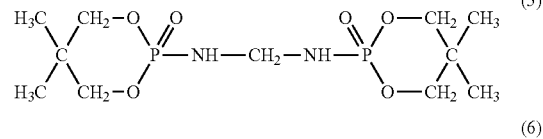

(5)

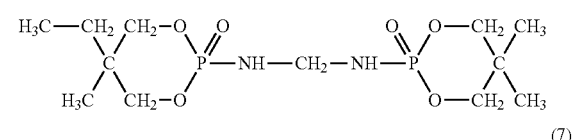

(6)

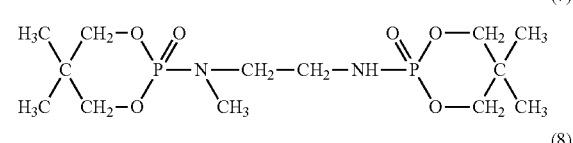

(7)

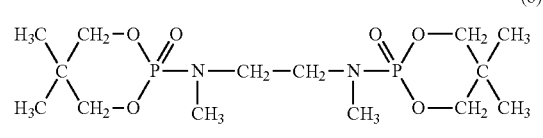

(8)

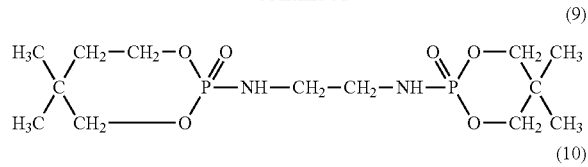

(9)

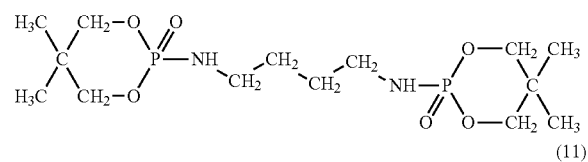

(10)

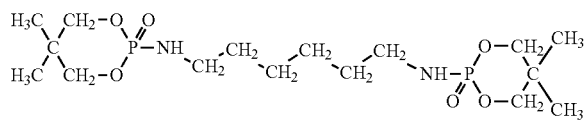

(11)

Among the phosphate ester amide compounds represented by the general formula (I), from the viewpoints of the easiness to obtain raw materials and a flame retardancy, $R_1$, $R_2$, $R_3$ and $R_4$ are preferably a hydrogen atom or methyl group, and more preferably a methyl group.

$R_{11}$, $R_{12}$, $R_{13}$ and $R_{14}$ of the general formula (I) are each preferably a methylene group.

From the viewpoint of a flame retardancy, $R_{15}$ of the general formula (I) is preferably those wherein the number of the carbon atoms is 1 to 4, and further preferably those wherein the number of the carbon atoms is 1 to 2.

From the viewpoint of a flame retardancy, it is particularly preferable that $R_5$ and $R_6$ of the general formula (I) is a hydrogen atom.

That is, among the compounds of the above-described formulas (1) to (11), the compounds of the formulas (1) to (5) are preferable, and the compound of the formula (4) is particularly preferable.

These phosphate ester amide compounds have an excellent flame retardancy and a thermoplastic resin composition comprising such a compound has also an excellent water-resistant property. Therefore, even in an environment of high temperature and high humidity, it is made possible to retain the physical properties without deteriorating a flame retardancy. One of these phosphate ester amide compounds can be used alone, and also a mixture of plurality of types of the phosphate ester amide compounds can be used.

<A Synthesis Method of a Phosphate Ester Amide Compound>

A method for synthesizing the phosphate ester amide compound represented by the general formula (I) is not particularly limited. It is possible to use a known synthesis method of a phosphate ester amide compound represented by the general formula (I) directly to perform the synthesis. In addition, it is also possible to appropriately modify the known synthesis method. Therefore, the phosphate ester amide compound represented by the general formula (I) can be synthesized by applying various reactions which are known in relation to synthesis of a phosphate ester amide compound.

Specifically, for example, in an exemplary method, a compound represented by the following general formula (VIa):

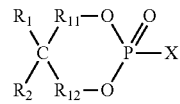

(VIa)

wherein $R_1$, $R_2$, $R_{11}$, and $R_{12}$ are the same as the definitions of the general formula (I), X represents a halogen atom such as Br, Cl or the like, and a corresponding amine compound, and optionally further the compound represented by the following general formula (VIb):

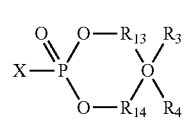

(VIb)

wherein $R_3$, $R_4$, $R_{13}$, and $R_{14}$ are the same as the definitions in the general formula (I), and X represents a halogen atom such as Br, Cl or the like, are allowed to react to obtain the phosphate ester amide compound represented by the general formula (I).

It should be noted that the compound of the formula (VIa) is obtained by, for example, reacting a phosphorus oxyhalide (for example, phosphorus oxychloride or phosphorus oxybromide) and a diol represented by the following formula (VIIa):

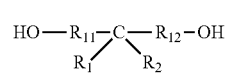

(VIIa)

(for example, 2,2-dimethyl-1,3-propanediol, 2-ethyl-2-methyl-1,3-propanediol or 2,2-dimethyl-1,4-butanediol or the like) in a molar ratio of 1:1.

The compound of the formula (VIb) can be also obtained by a similar method. That is, a phosphorus oxyhalide (for example, phosphorus oxychloride or phosphorus oxybromide) and a diol represented by the following formula (VIIb):

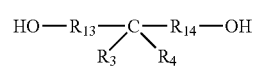

(VIIb)

(for example, 2,2-dimethyl-1,3-propane diol, 2-ethyl-2-methyl-1,3-propane diol, or 2,2-dimethyl-1,4-butane diol or the like) are allowed to react in a molar ratio of 1:1, and thereby the compound of the formula (VIb) is obtained.

At the time of synthesizing the compound of the formula (VIa) or the compound of the formula (VIb), if necessary, the reaction of a phosphorus oxyhalide and a diol can be performed in an organic solvent. Regarding an organic solvent, a solvent having no reaction activity with phosphorus oxyhalide and diol which are the raw materials can be used. For example, toluene, xylene, chlorobenzene, dichlorobenzene, 1,4-dioxane and the like can be used.

When the phosphate ester amide compound is a compound represented by the general formula (I) and the two phosphorus-containing rings in the compound have the same structure (that is, when $R_1$, $R_2$, $R_{11}$ and $R_{12}$ are the same as $R_3$, $R_4$, $R_{13}$ and $R_{14}$), a compound of the general formula (VIa) which corresponds to the structure of the phosphorus-containing ring and a diamine which corresponds to the structure of the moiety of —N($R_5$)—$R_{15}$—N($R_6$)—, for example, ethylene diamine, may be allowed to react in a molar ratio of 2:1.

When the phosphate ester amide compound is a compound represented by the general formula (I) and the two phosphorus-containing rings in the compound have different structures, a compound of the general formula (VIa) and a compound of the general formula (VIb) which correspond to the two phosphorus-containing rings, and a diamine which corresponds to the structure of the moiety of —N($R_5$)—$R_{15}$—N($R_6$)— (for example, ethylene diamine) may be allowed to react in a molar ratio of 1:1:1. For the reaction, it is possible to allow three types of compounds to react in one step, or it is possible to perform a reaction of the compound of the general formula (VIa) and a diamine and thereafter perform a reaction with the compound of the general formula (VIb).

When the flame retardant composition or flame retardant thermoplastic resin composition of the present invention is prepared, it is preferable to make particles of the phosphate ester amide compound of component (A) having a small particle diameter and use the small particles in the preparation. If the particle diameter is small, then it is made easy to uniformly disperse the phosphate ester amide compound into a thermoplastic resin. Specifically, an average particle diameter of particles of the phosphate ester amide compound is preferably 50 μm or lower, and further preferably the average particle diameter is 20 μm or lower. The lower limit of the average particle diameter is not particularly limited. However, for example, those wherein the average particle diameter is 0.1 μm or more, or 1 μm or more can be used. When particles having a very small average particle diameter are produced, a cost for producing the particles may be expensive. A method for measuring a particle diameter is not particularly limited. For example, a laser diffraction particle diameter distribution measurement device (SALD (registered trade mark)-2300 made by Shimadzu Corporation) and the like can be used.

<Component (B)>

Component (B) is a nitrogen-containing compound having a 1,3,5-triazine structure or a 1,3,5-triazine fused ring structure.

The 1,3,5-triazine structure is a 6-membered ring structure consisting of 3 carbon atoms and 3 nitrogen atoms.

In the present specification, a 1,3,5-triazine fused ring refers to a fused ring which is formed by fusing a plurality of 1,3,5-triazine rings. In the present specification, a 1,3,5-triazine fused ring structure refers to a structure of a fused ring which is formed by fusing a plurality of 1,3,5-triazine rings.

The compound of component (B) may be a compound having one 1,3,5-triazine structure, or may be a compound having a plurality of 1,3,5-triazine structures. Specifically, the compound having one 1,3,5-triazine structure is a compound represented by the following formula (B1).

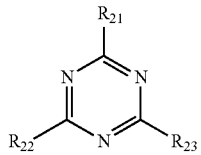

(B1)

In the above-described formula (B1), $R_{21}$, $R_{22}$ and $R_{23}$ are each independently a hydrogen atom or an optional monovalent substituent. Preferably, at least one of $R_{21}$, $R_{22}$ and $R_{23}$ is other than a hydrogen atom. More preferably, at least one of $R_{21}$, $R_{22}$ and $R_{23}$ is an amino group or a substituted amino group. Further preferably, $R_{21}$, $R_{22}$ and $R_{23}$ are each independently an amino group or a substituted amino group. Particularly preferably, each of $R_{21}$, $R_{22}$ and $R_{23}$ is an amino group.

The above-described optional monovalent substituent is preferably an alkyl group having 1 to 12 carbon atoms, an aryl group having 6 to 10 carbon atoms, an alkyl group having 1 to 12 carbon atoms having a carbon-carbon unsaturated bond, an alkylcarbonyl group having 1 to 12 carbon atoms, a hydroxy group, an alkoxy group having 1 to 12 carbon atoms, or a mercapto group.

The above-described substituted amino group represents an amino group in which at least one of the hydrogen atoms bonded to the nitrogen atom in the amino group is substituted with an optional monovalent substituent. Preferably, it is a substituted amino group which is substituted with an alkyl group having 1 to 12 carbon atoms, an aryl group having 6 to 10 carbon atoms, an alkyl group having 1 to 12 carbon atoms having an unsaturated carbon-carbon bond, or an alkylcarbonyl group having 1 to 12 carbon atoms.

In the compound of component (B), an amine compound having a 1,3,5-triazine structure refers to a compound having a 1,3,5-triazine ring structure and an amino group. Examples of the amine compound having a 1,3,5-triazine structure are, for example, compounds in which at least one of $R_{21}$, $R_{22}$ and $R_{23}$ in the above-described formula (B1) is an amino group or a substituted amino group. Alternatively, it may be a compound in which at least one of $R_{21}$, $R_{22}$ and $R_{23}$ comprises an amino group or a substituted amino group. For example, it may be a compound in which at least one of $R_{21}$, $R_{22}$ and $R_{23}$ is an aminoalkyl group. Preferably, each of $R_{21}$, $R_{22}$ and $R_{23}$ is independently an amino group or a substituted amino group. More preferably, each of $R_{21}$, $R_{22}$ and $R_{23}$ is an amino group.

The compound having the structure of the above-described formula (B1) may be a salt. For example, a salt of melamine can be used. As a type of the salt, for example, an acid addition salt in which an acidic compound is added to basic nitrogen in the compound (for example, melamine phosphate or melamine pyrophosphate (a salt in which the molar ratio of "pyrophosphoric acid:melamine" is 1:1)), and the like are included. As the acid addition salt, a phosphate salt or a pyrophosphate salt (a salt in which the molar ratio of "pyrophosphoric acid:a compound having a basic nitrogen" is 1:1) is preferable.

Among the salts of the compounds having the structure of the above-described formula (B1), preferable salts are a phosphate salt or pyrophosphate salt of the compounds of the above-described formula (B1). More preferably, the salt is a phosphate salt or pyrophosphate salt of melamine.

In one preferable embodiment, one, two or three of $R_{21}$, $R_{22}$ and $R_{23}$ of the amine compound having a 1,3,5-triazine ring structure of the above-described formula (B1) are amino groups, and at least one of the amino groups forms a salt with an acidic compound (e.g., a compound having a phosphoric acid group). From this viewpoint that an amino group forms a salt with an acidic compound, a phosphate salt and a pyrophosphate salt of melamine are preferable.

It should be noted that in the present specification, a phosphate salt refers to a salt of phosphoric acid and the nitrogen-containing compound of component (B), and the molar ratio of "phosphoric acid:a nitrogen-containing compound" is not particularly limited. That is, it may be a salt in which only one molecule of a nitrogen-containing compound is bound to one molecule of phosphoric acid, or it may be a salt in which a plurality of nitrogen-containing compound molecules are bound to one molecule of phosphoric acid. In addition, it may be a salt in which only one molecule of a nitrogen-containing compound is bound to a plurality of phosphoric acid molecules. Preferably, the molar ratio of "phosphoric acid: a nitrogen-containing compound" is 1:1.

In the present specification, a melamine phosphate refers to a salt of phosphoric acid and melamine, and the molar ratio of "phosphoric acid:melamine" is not particularly limited. That is, it may be a salt in which only one molecule of melamine is bonded to one molecule of phosphoric acid, or it may be a salt in which a plurality of melamine molecules are bonded to one molecule of phosphoric acid. In addition, it may be a salt in which only one molecule of melamine is bound to a plurality of phosphoric acid molecules. Preferably, the molar ratio of "phosphoric acid: melamine" is 1:1.

In the present specification, a pyrophosphate salt refers to a salt of pyrophosphoric acid and a nitrogen-containing compound of component (B), and the molar ratio of "pyrophosphoric acid:a nitrogen-containing compound" is not particularly limited. That is, it may be a salt in which only one molecule of a nitrogen-containing compound is bound to one pyrophosphoric acid molecule, or it may be a salt in which a plurality of nitrogen-containing compound molecules are bound to one pyrophosphoric acid molecule. Preferably, the molar ratio of "pyrophosphate:a nitrogen-containing compound" is 1:1 or 1:2.

In the present specification, a melamine pyrophosphate refers to a salt of pyrophosphoric acid and melamine, and the molar ratio of "pyrophosphoric acid:melamine" is not particularly limited. That is, it may be a salt in which only one molecule of melamine is bound to one molecule of pyrophosphoric acid, or it may be a salt in which plural melamine molecules are bound to one molecule of pyrophosphoric acid. Preferably, the molar ratio of "pyrophosphoric acid: melamine" is 1:1 or 1:2.

Further, in the present specification, a polyphosphate salt refers to a salt of polyphosphoric acid and a nitrogen-containing compound of component (B), and the molar ratio of "polyphosphoric acid:a nitrogen-containing compound" is not particularly limited. That is, it may be a salt in which only one molecule of a nitrogen-containing compound is bound to one molecule of polyphosphoric acid, or it may be a salt in which a plurality of nitrogen-containing compound molecules are bound to one molecule of polyphosphoric acid.

In the present specification, a melamine polyphosphate refers to a salt of polyphosphoric acid and melamine, and the molar ratio of "polyphosphoric acid:melamine" is not particularly limited. That is, it may be a salt in which only one molecule of melamine is bonded to one molecule of polyphosphoric acid, or it may be a salt in which plural melamine molecules are bonded to one molecule of polyphosphoric acid.

The compound having a plurality of 1,3,5-triazine structures may be a compound in which at least one of $R_{21}$ to $R_{23}$ in the above-described formula (B1) has a 1,3,5-triazine structure. That is, it may be a compound having a structure in which a plurality of 1,3,5-triazine structures are connected (for example, melam).

In addition, the compound having a plurality of 1,3,5-triazine structures may be a compound having a structure in which a plurality of 1,3,5-triazine structures are bonded to at least one skeleton structure. That is, it may be a compound having a structure in which a plurality of 1,3,5-triazine structures are bonded to the main chain (for example, melamine pyrophosphate (a salt in which a molar ratio of "pyrophosphoric acid:melamine" is 1:2), and melamine polyphosphate).

The 1,3,5-triazine fused ring is formed, for example, by deammonia condensation of melamine. Examples of the compound having a 1,3,5-triazine fused ring structure include, for example, a compound represented by the following formula (B2).

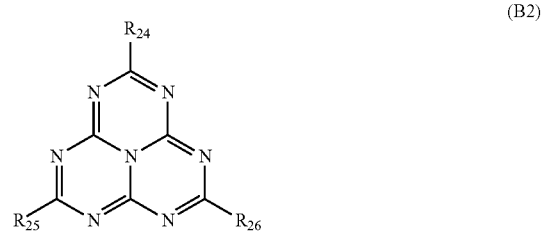

(B2)

In the above-described formula (B2), $R_{24}$, $R_{25}$ and $R_{26}$ may independently be a hydrogen atom or an optional monovalent substituent. Preferably, at least one of $R_{24}$, $R_{25}$ and $R_{26}$ is other than a hydrogen atom. More preferably, at least one of $R_{24}$, $R_{25}$ and $R_{26}$ is an amino group or a substituted amino group. Further preferably, $R_{24}$, $R_{25}$ and $R_{26}$ are each independently an amino group or a substituted amino group. Particularly preferably, each of $R_{24}$, $R_{25}$ and $R_{26}$ is an amino group.

The above-described optional monovalent substituent is preferably an alkyl group having 1 to 12 carbon atoms, an aryl group having 6 to 10 carbon atoms, an alkyl group having an unsaturated carbon-carbon bond having 1 to 12 carbon atoms, an alkylcarbonyl group having 1 to 12 carbon atoms, a hydroxy group, an alkoxy group having 1 to 12 carbon atoms, or a mercapto group.

The above-described substituted amino group represents an amino group in which at least one of the hydrogen atoms bonded to the nitrogen atom in the amino group is substituted with an optional monovalent substituent. Preferably, it is a substituted amino group which is substituted with an alkyl group having 1 to 12 carbon atoms, an aryl group having 6 to 10 carbon atoms, an alkyl group having an unsaturated carbon-carbon bond having 1 to 12 carbon atoms, or an alkylcarbonyl group having 1 to 12 carbon atoms.

In the compound of component (B), an amine compound having a 1,3,5-triazine fused ring structure refers to a compound having a 1,3,5-triazine fused ring structure and an amino group. Examples of the amine compound having a 1,3,5-triazine fused ring structure are, for example, compounds of the above-described formula (B2) in which at least one of $R_{24}$, $R_{25}$ and $R_{26}$ is an amino group or a substituted amino group. Alternatively, it may be a compound in which at least one of $R_{24}$, $R_{25}$ and $R_{26}$ comprises an amino group or a substituted amino group. For example, it may be a compound in which at least one of $R_{24}$, $R_{25}$ and $R_{26}$ is an aminoalkyl group. Preferably, each of $R_{24}$, $R_{25}$ and $R_{26}$ is independently an amino group or a substituted amino group. More preferably, each of $R_{24}$, $R_{25}$ and $R_{26}$ is an amino group.

The compound having the structure of the above-described formula (B2) may be a salt. For example, salts of compounds having a structure in which a plurality of melamine molecules are fused can be used. Types of salts include, for example, acid addition salts in which an acidic compound is added to basic nitrogen in the compound (for example, melem phosphate or melem pyrophosphate). As the acid addition salt, a phosphate salt and a pyrophosphate salt are preferable.

Among the salts of the compound having the structure of the above-described formula (B2), preferable salts are a phosphate salt or a pyrophosphate salt of the compound of the above-described formula (B2). More preferably, it is a phosphate salt or a pyrophosphate salt of a compound having a structure in which a plurality of melamine molecules are fused.

In one preferable embodiment, one, two or three of $R_{24}$, $R_{25}$ and $R_{26}$ of an amine compound having a 1,3,5-triazine fused ring structure of the above-described formula (B2) is an amino group, and at least one of the amino groups forms a salt with an acidic compound (e.g., a compound having a phosphoric acid group). From the viewpoint that the amino group forms a salt with an acidic compound, a phosphate salt and a pyrophosphate salt of a compound having a structure in which a plurality of melamine molecules are fused are preferable.

The compound having a plurality of 1,3,5-triazine fused ring structures may be a compound in which at least one of $R_{24}$ to $R_{26}$ in the above-described formula (B2) has a 1,3,5-triazine fused ring structure. That is, it can be a compound (for example, melone) which has a structure in which a plurality of 1,3,5-triazine fused ring structures are connected.

In addition, a compound having a plurality of 1,3,5-triazine fused ring structures may be a compound having a structure in which a plurality of 1,3,5-triazine fused ring structures are bonded to at least one skeleton structure. That is, it can also be a compound having a structure in which a plurality of 1,3,5-triazine fused ring structures are bonded to a main chain (for example, melem pyrophosphate or melem polyphosphate).

In addition, the compound having a 1,3,5-triazine fused ring structure may be a compound in which at least one of $R_{24}$ to $R_{26}$ in the above-described formula (B2) has a 1,3,5-triazine structure. That is, it can be a compound having a structure in which a plurality of 1,3,5-triazine structures and a plurality of 1,3,5-triazine fused ring structures are connected.

In addition, a compound having a plurality of 1,3,5-triazine structures and a plurality of 1,3,5-triazine fused ring structures may be a compound having a structure in which a plurality of 1,3,5-triazine ring structures and a plurality of 1,3,5-triazine fused ring structures are bonded to at least one skeleton structure. That is, it may be a compound having a structure in which a plurality of 1,3,5-triazine ring structures and a plurality of 1,3,5-triazine fused ring structures are bonded to a main chain.

In one preferable embodiment, the nitrogen-containing compound of component (B) has a structure in which a main chain is a polymer, and a 1,3,5-triazine ring or a 1,3,5-triazine fused ring is bound to the polymer. Such a compound is represented by, for example, the following formula (B3):

[Y—Z]$_n$-Q  (B3)

In the formula (B3), Q is a polymer. Q has a binding group, and preferably has an acidic group as a binding group. The molecular weight of the polymer is preferably 150 or more, more preferably 200 or more, further preferably 500 or more, still more preferably 1,000 or more, and particularly preferably 2,000 or more. The molecular weight of the polymer is preferably 1,000,000 or less, more preferably 100,000 or less, further preferably 20,000 or less, still more preferably 10,000 or less, and particularly preferably 5,000 or less.

The polymer Q in the formula (B3) is represented by, for example, the following formula (B3A):

$Q_a$-$(Q_b)_m$-$Q_c$  (B3A)

In the formula (B3A), $Q_a$ and $Q_c$ represent a terminal group. $Q_b$ is a repeating unit having a binding group. m represents the number of binding groups comprised in Q. For example, examples of a binding group include an acidic group. The binding group is preferably an acidic —OH group in an oxygen acid containing a sulfur atom, a nitrogen atom or a phosphorus atom. More preferably, the binding group is an OH group in phosphoric acid. m is an integer of 2 or more. In one embodiment, m is 2. In another embodiment, m is 3 or more. Further, in another embodiment, m is 4 or more, and in yet another embodiment, m is 5 or more. m is preferably 10,000 or less, and is more preferably 1,000 or less. The binding group forms a bond with Z of the formula (B3).

In one embodiment, the polymer Q in the formula (B3) is, for example, represented by the following formula (B3B):

$Q_a$-$(Q_b)_{ma}$-$Q_c$  (B3B)

In the Formula (B3B), the definitions of $Q_a$, $Q_b$ and $Q_c$ are the same as the definitions of $Q_a$, $Q_b$ and $Q_c$ in the Formula (B3A). $m_a$ is an integer of 3 or more. In one embodiment, $m_a$ is an integer of 4 or more. In another embodiment, $m_a$ is an integer of 5 or more.

In one embodiment, the polymer Q is preferably a compound represented by the following formula (B4).

(B4)

Similarly to m in the formula (B3A), m in the formula (B4) is an integer of 2 or more. In one embodiment, m is 2. In another embodiment, m is 3 or more. Further, in another embodiment, m is 4 or more, and in yet another embodiment, m is 5 or more.

The molecular weight of the formula (B4) is preferably 200 or more, more preferably 500 or more, further preferably 1,000 or more, and furthermore preferably 2,000 or more. The molecular weight of the formula (B4) is preferably 1,000,000 or less, more preferably 100,000 or less, further preferably 20,000 or less, furthermore preferably 10,000 or less, and still more preferably less than 5,000.

In the formula (B3), Y is a partial structure comprising a 1,3,5-triazine structure or a 1,3,5-triazine fused ring structure, and Z is a moiety binding the 1,3,5-triazine structure or 1,3,5-triazine fused ring structure and the polymer Q. Z is preferably a residue after the amino group is bound to an acidic group of the polymer.

n is any positive integer. In one embodiment, n is 1. In another embodiment, n is preferably 2 or more, more preferably 3 or more, further preferably 5 or more, still more preferably 10 or more, and furthermore preferably 20 or more. n is preferably 10,000 or less, more preferably 1,000 or less, further preferably 250 or less, still more preferably 120 or less, and furthermore preferably 70 or less.

The ratio of m (the number of the binding groups) and n (the number of the 1,3,5-triazine structures or 1,3,5-triazine fused ring structures), i.e., n/m, is not particularly limited. However, from the viewpoint of moldability and easiness of handling, in one embodiment it is 0.1 or more, in another embodiment 0.3 or more, preferably 0.5 or more, more preferably 0.7 or more. Still more preferably, it is 0.8 or more, furthermore preferably 0.9 or more. Also, the ratio n/m is, in one embodiment, 2.0 or less, and in another embodiment, 1.7 or less, preferably 1.5 or less, more preferably 1.3 or less, furthermore preferably 1.2 or less, still more preferably 1.1 or less, and particularly preferably 1.0 or less.

Moreover, in one embodiment, the polymer Q is preferably a pyrophosphoric acid represented by the following formula (B4A).

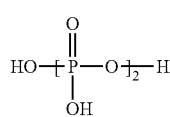

(B4A)

In addition, in another embodiment, the polymer Q is a polyphosphoric acid represented by the following formula (B4B)

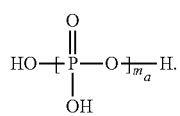

(B4B)

In the formula, $m_a$ is an integer of 3 or more. In one embodiment, $m_a$ is an integer of 4 or more. In another embodiment, $m_a$ is an integer of 5 or more.

It should be noted that in the present specification, the term "polymer", in the broadest definition, refers to those having a degree of polymerization of 2 or more, but the term "polyphosphoric acid" refers to those having a degree of polymerization of 3 or more. Thus, in the present specification, pyrophosphoric acid is included in the broadest definition of a polymer but is not included in the definition of a polyphosphoric acid.

In one preferable embodiment, the nitrogen-containing compound of component (B) has an amino group, and the amino group is directly or indirectly bonded to the carbon of the triazine ring or triazine fused ring. More preferably, the amino group is directly bonded to the carbon of the triazine ring or triazine fused ring to form a structure of —N═C(—NH$_2$)—N═. In a particularly preferable embodiment, the nitrogen-containing compound of component (B) has an amino group attached directly to the carbon of the triazine ring or triazine fused ring, and the amino group is connected to the acidic group in the polymer.

A compound of the formula (B3) in which Y has a 1,3,5-triazine structure is specifically represented by, for example, the following formula (B1A):

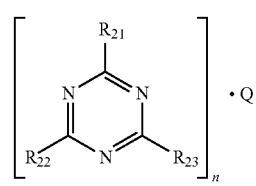

(B1A)

wherein, Q is a polymer and n is any positive integer.

Q is preferably a polymer forming a stable bond with the 1,3,5-triazine structure or $R_{21}$, $R_{22}$ or $R_{23}$, more preferably a polymer having an acidic group, and specifically, for example, it is pyrophosphoric acid represented by the above-described formula (B4A) or a polyphosphoric acid represented by the above-described formula (B4), and more preferably a polyphosphoric acid represented by the above-described formula (B4).

As $R_{21}$, $R_{22}$ and $R_{23}$ in the above-described formula (B1A) those which are the same as $R_{21}$, $R_{22}$ and $R_{23}$ in the formula (B1) can be used. That is, $R_{21}$, $R_{22}$ and $R_{23}$ are a hydrogen atom or any monovalent substituent. Preferably, at least one of $R_{24}$, $R_{25}$ and $R_{26}$ is other than a hydrogen atom. More preferably, at least one of $R_{21}$, $R_{22}$ and $R_{23}$ is an amino group or a substituted amino group. Further preferably, $R_{21}$, $R_{22}$ and $R_{23}$ are each independently an amino group or a substituted amino group. Particularly preferably, each of $R_{21}$, $R_{22}$ and $R_{23}$ is an amino group.

The compound having the structure of the above-described formula (B1A) may be a salt. Examples of types of the salt include an acid addition salt in which an acidic compound is added to basic nitrogen in the compound. As the acid addition salt, a phosphate salt and a pyrophosphate salt are preferable.

Among the compound salts having the structure of the above-described formula (B1A), preferable salts are the phosphate salt or pyrophosphate salt of the compound of the above-described formula (B1A).

In one embodiment, in the above-described formula (B1A), Q is a polymer having an acidic group, and at least one of $R_{21}$, $R_{22}$ and $R_{23}$ is a basic substituent, and is bonded to an acidic group in the polymer. In a preferable embodiment, Q is a pyrophosphoric acid represented by the formula (B4A) or a polyphosphoric acid represented by the formula (B4B), wherein at least one of $R_{21}$, $R_{22}$ and $R_{23}$ is an amino group, and a bond is formed between the amino group and the acidic group (P—OH) in the pyrophosphoric acid or polyphosphoric acid.

Examples of the compound of the formula (B3) where Y has a 1,3,5-triazine fused ring structure include compounds represented by the following formula (B2A).

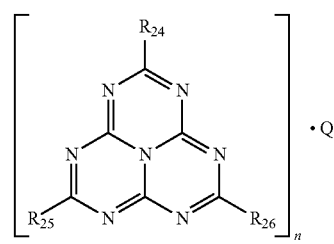

(B2A)

In the above-described formula (B2A), $R_{24}$, $R_{25}$ and $R_{26}$ are independently a hydrogen atom or any monovalent substituent. Preferably, at least one of $R_{24}$, $R_{25}$ and $R_{26}$ is other than a hydrogen atom. More preferably, at least one of $R_{24}$, $R_{25}$ and $R_{26}$ is an amino group or a substituted amino group. More preferably, $R_{24}$, $R_{25}$ and $R_{26}$ are each independently an amino group or a substituted amino group. Particularly preferably, each of $R_{24}$, $R_{25}$ and $R_{26}$ is an amino group. As the acid addition salt, a phosphate salt and pyrophosphate salt are preferable.

Among the compound salts having the structure of the above-described formula (B2A), preferable salts are a phosphate salt and pyrophosphate salt of the compound of the above-described formula (B2A).

The compound having the structure of the above-described formula (B2A) may be a salt. Examples of types of the salt include an acid addition salt in which an acidic compound is added to basic nitrogen in the compound.

In one embodiment, in the above-described formula (B2A), Q is a polymer having an acidic group, and at least one of $R_{24}$, $R_{25}$ and $R_{26}$ is a basic substituent, and is bonded to an acidic group in the polymer. In a preferable embodiment, Q is a polyphosphoric acid represented by the above-described formula (B4), and at least one of $R_{24}$, $R_{25}$ and $R_{26}$ is an amino group, and a bond is formed between an amino group and an acidic group (P—OH) in the polyphosphoric acid.

Specific examples of the nitrogen-containing compound having a 1,3,5-triazine structure and the amine compound having a 1,3,5-triazine structure include, for example, melamine, ureidomelamine, $N^2,N^4$-diethylmelamine, N,N'-diallylmelamine, hexamethylmelamine, melam, ammeline, ammelide, melamine phosphate, melam phosphate, melamine phosphonate, melamine phosphinate, melamine sulfate, melamine nitrate, melamine borate, melamine pyrophosphate, melam pyrophosphate, melamine polyphosphate, melam polyphosphate, melamine metaphosphate, melam metaphosphate, melamine cyanurate, and a homopolymer of 2-piperazinylene-4-morpholino-1,3,5-triazine, acetoguanamine, benzoguanamine, acryloguanamine, methacryloguanamine, 2,4-diamino-6-nonyl-1,3,5-triazine, 2,4-diamino-6-hydroxy-1,3,5-triazine, 2-amino-4,6-dihydroxy-1,3,5-triazine, 2,4-diamino-6-methoxy-1,3,5-triazine, 2,4-diamino-6-ethoxy-1,3,5-triazine, 2,4-diamino-6-propoxy-1,3,5-triazine, 2,4-diamino-6-isopropoxy-1,3,5-triazine, 2,4-diamino-6-mercapto-1,3,5-triazine and 2-amino-4,6-dimercapto-1,3,5-triazine, and their phosphate salt, pyrophosphate salt or polyphosphate salt and the like.

Also, the nitrogen-containing compound having a 1,3,5-triazine structure may be a compound represented by the following formula (B5), or a phosphate salt, pyrophosphate salt or polyphosphate salt of a compound of the following formula (B5).

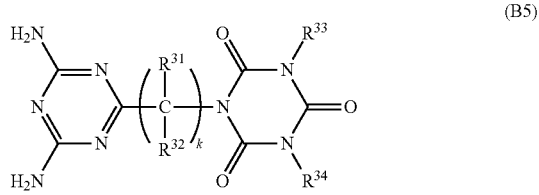

(B5)

In the formula, k represents an integer of 1 or more, and preferably k is an integer of 1 to 4. $R^{31}$ and $R^{32}$ are the same or different and are a hydrogen atom or an alkyl group. $R^{33}$ and $R^{34}$ are the same or different and are a hydrogen atom, an alkyl group, a cyanoalkyl group, a carboxyalkyl group, an alkoxycarbonylalkyl group, an aryloxycarbonylalkyl group, a haloformylalkyl group, or a guanamyl alkyl group. The number of the carbon atoms of each of the alkyl group and the alkoxy group is preferably 1 to 6. The number of the carbon atoms of the aryl is preferably 6 to 12.

Specific examples of the nitrogen-containing compound having a 1,3,5-triazine fused ring structure and the amine compound having a 1,3,5-triazine fused ring structure include, for example, melem, melone, melem pyrophosphate, melem polyphosphate, melone pyrophosphate, melone polyphosphate and the like. It should be noted that in the present specification, "melone" refers to a compound having a structure in which melem is fused. Melone polyphosphate refers to a compound having a structure in which melone is bonded to a polyphosphoric acid. Melone pyrophosphate refers to a compound having a structure in which melone is bonded to pyrophosphoric acid.

Specific examples of the nitrogen-containing compound of the component (B) are preferably melamine phosphate, melam phosphate, melem phosphate, melone phosphate, melamine metaphosphate, melam metaphosphate, melem metaphosphate, melone metaphosphate, melamine pyrophosphate, melam pyrophosphate, melem pyrophosphate, melone pyrophosphate, melamine polyphosphate, melam polyphosphate, melem polyphosphate and melone polyphosphate. More preferable specific examples are melamine phosphate, melamine pyrophosphate and melamine polyphosphate.

<Flame Retardant Composition>

The flame retardant composition of the present invention comprises the above-described component (A) and the above-described component (B). By combining the above-described component (A) and the above-described component (B), it is possible to improve a water-resistant property which was the problem of prior art while the high flame retardant performance is maintained.

The phosphate ester amide compound represented by the general formula (I) is used in combination with a nitrogen-containing compound to exert an excellent flame retardant effect. In a preferable embodiment, a value of a blending ratio (mass ratio) (A)/(B) can be higher than 1, and thereby a significantly high flame retardant performance can be achieved.

A lower limit value of the mass ratio of a blending ratio (A)/(B) of the phosphate ester amide compound represented by the general formula (I) and the nitrogen-containing compound is preferably 1 or more, more preferably 1.3 or more, further preferably 1.5 or more, still more preferably 1.7 or more, and particularly preferably 2 or more. In addition, an upper limit value of the mass ratio of (A)/(B) is preferably 6 or lower, more preferably 5 or lower, and further preferably 4 or lower. When the value of (A)/(B) is too low or too high, the flame retardant performance would be lower in comparison with the case where the value of (A)/(B) is within a preferable range.

<Component (C)>

In one embodiment of the present invention, as an auxiliary agent, a metal oxide or metal salt is added to the flame retardant composition, and thereby the flame retardancy is further improved.

As the metal oxide, any metal oxides which are known as a flame retardant auxiliary agent can be used. A metal which constitutes the metal oxide can be any metal. Transition metals or alkaline earth metals are preferable.

Specific examples of the metal oxide include, for example, zinc oxide, zirconium oxide, silver oxide, magnesium oxide, aluminum oxide, titanium oxide, molybdenum trioxide, bismuth oxide, stannic oxide, and the like.

As the metal salt, any metal salts which are known as a flame retardant auxiliary agent can be used. A metal which constitutes the metal salt can be any metal. Transition metals and alkaline earth metals are preferable. In one embodiment, the metal which constitutes the metal salt is a divalent metal or trivalent metal. For example, specific examples of the metal which constitute the metal salt include magnesium, calcium, strontium, barium, aluminum, germanium, tin, antimony, bismuth, zinc, titanium, zirconium, manganese, iron and cerium. In a preferable embodiment, the metal which constitutes the metal salt is aluminum, calcium or zinc. Each of these metals can form a metal salt in combination with various acids which are described later.

In addition, regarding the types of the acid which is bound to the metal in the metal salt, any acids can be used. Acids which contain oxygen, that is, oxygen acids are preferable. More preferably, the acid is an oxygen acid which contains sulfur atom, nitrogen atom or phosphorus atom and an oxygen atom. In addition, the acid can be an inorganic acid or can be an organic acid. Regarding the types of the inorganic acid, specific examples include sulfuric acid, nitric acid, phosphoric acid, metaphosphoric acid, tripolyphosphoric acid, polyphosphoric acid, hypophosphorous acid, and the like. Types of the organic acid include those in which the above-described various inorganic acid is bound to an organic group (for example, alkyl group). Therefore, in a preferable embodiment, the metal salt is a metal salt of sulfuric acid, nitric acid, phosphoric acid, metaphosphoric acid, triphosphoric acid, polyphosphoric acid, or hypophosphorous acid, or an organic phosphinic acid metal salt, an organic diphosphinic acid metal salt or an organic polyphosphinic acid metal salt.

Specific examples of a metal salt of sulfuric acid include, for example, magnesium sulfate, aluminum sulfate, barium sulfate, zinc sulfate and the like.

Specific examples of a metal salt of nitric acid includes, for example, magnesium nitrate, aluminum nitrate, barium nitrate, zinc nitrate, and the like.

Specific examples of a metal salt of phosphoric acid include, for example, magnesium phosphate, calcium phosphate, aluminum phosphate, zinc phosphate, and the like.

Specific examples of a metal salt of hypophosphorous acid includes, for example, aluminum hypophosphite, calcium hypophosphite and the like.

In one embodiment, as a metal salt, it is possible to use an organic phosphinic acid metal salt, an organic diphosphinic acid metal salt or an organic polyphosphinic acid metal salt.

In the present specification, an organic phosphinic acid refers to a phosphinic acid which has an organic group. In an organic phosphinic acid, 1 or 2 hydrogen atoms are substituted with organic groups. Preferably, 2 hydrogen atoms are substituted with organic groups. The organic group is preferably an alkyl group, and more preferably an alkyl group in which the number of carbon atoms is 1 to 6. Further preferably, it is an alkyl group in which the number of carbon atoms is 1 to 3, and particularly preferably, it is an ethyl group.

In one embodiment, the organic phosphinic acid metal salt is represented by the following formula (II):

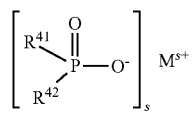
(II)

wherein $R^{41}$ and $R^{42}$ are independently a straight chain or branched chain alkyl group in which the number of carbon atoms is 1 to 6, wherein M is a divalent metal (for example, calcium or zinc) and s is 2, or M is a trivalent metal (for example, aluminum) and s is 3.

In one preferable embodiment, the organic phosphinic acid metal salt is a tris(dialkylphosphinic acid) aluminum salt, bis(dialkylphosphinic acid) calcium salt, or bis(dialkylphosphinic acid) zinc salt. In particular, those in which the number of the carbon atoms of the alkyl is 1 to 3 are preferable and those in which the number of the carbon atoms of the alkyl is 2 are further preferable.

Specific examples of the organic phosphinic acid metal salt include, for example, bis(methylethylphosphinic acid) magnesium salt, tris(methylethylphosphinic acid) aluminum salt, bis(methylethylphosphinic acid) zinc salt, tris(methylethylphosphinic acid) iron salt, tris(diethylphosphinic acid) aluminum salt, bis(diethylphosphinic acid) zinc salt and the like. Preferable specific examples of the organic phosphinic acid metal salt are tris(diethylphosphinic acid) aluminum salt, and bis(diethylphosphinic acid) zinc salt.

In the present specification, an organic diphosphinic acid refers to a compound which has a structure wherein phosphorus atoms in two molecules of an organic phosphinic acid are connected via an organic group. The organic group which connects the phosphorus atoms of the two organic phosphinic acid is preferably a divalent hydrocarbon group, and is specifically, for example, an alkylene group, arylene group, alkylarylene group, arylalkylene group or the like. The number of carbon atoms in the alkyl moiety in these hydrocarbon groups is preferably 1 to 6. The number of the carbon atoms of the aryl moiety in these hydrocarbon groups is preferably 6 to 12.

In one embodiment, the organic diphosphinic acid metal salt is represented by the following formula (III):

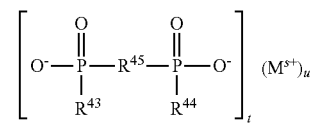
(III)

wherein, $R^{43}$ and $R^{44}$ are independently a straight chain or branched chain alkyl group in which the number of carbon atoms is 1 to 6, $R^{45}$ is, a straight chain or branched chain alkylene group in which the number of carbon atoms is 1 to 10, an arylene group in which the number of carbon atoms is 6 to 10, an alkylarylene group, or an arylalkylene group, wherein M is a divalent metal (for example, calcium or zinc), wherein s is 2, t is 1, and u is 1, or M is a trivalent metal (for example, aluminum) wherein s is 3, t is 3, and u is 2.

Specific examples of the organic diphosphinic acid metal salt include, for example, methanedi(methylphosphinic acid) aluminum salt, methanedi(methylphosphinic acid) zinc salt, ethanedi(ethylphosphinic acid) aluminum salt, ethanedi(ethylphosphinic acid) zinc salt and the like.

In the present specification, an organic polyphosphinic acid refers to a polymer which has a structure wherein 3 or more molecules of the above-described organic phosphinic acid are connected. A conventionally known organic polyphosphinic acid metal salt can be used in the present invention. Specifically, for example, a metal salt of an acid whose name is described in Japanese National Phase Laid-open Publication No. 2002-540224 as "polymeric phosphinic acid" can be used.

In one embodiment, the organic polyphosphinic acid metal salt is represented by the following formula (IV):

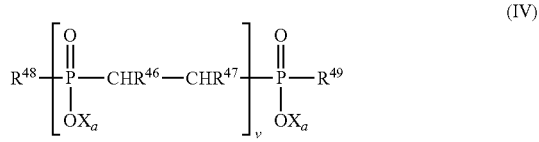

wherein $X_a$ independently refers to a hydrogen atom or metal atom. In this regard, if a valence of the metal atom is y, then y oxygen atoms are bound to one metal atom. That is, one oxygen atom is bound to (1/y) metal atoms. For example, when $X_a$ is a divalent metal (for example, calcium or zinc), "—$OX_a$" is "—$O^-(X_a^{2+})_{1/2}$" wherein two oxygen atoms are bound to one $X_a$ atom. That is, the structure of "$(-O^-)_2 X_a^{2+}$" is formed. When $X_a$ is a trivalent metal (for example, aluminum), "—$OX_a$" is "—$O^- (X_a^{3+})_{1/3}$", wherein three oxygen atoms are bound to one $X_a$ atom. That is, the structure of "$(-O^-)_3 X_a^{3+}$" is formed.

$R^{46}$ and $R^{47}$ are independently a hydrogen atom, carboxyl group, carboxylic acid derivative, unsubstituted or substituted alkyl group in which the number of carbon atoms is 1 to 10, phenyl group, benzyl group or alkyl-substituted aromatic group.

In this regard, the carboxylic acid derivative group is preferably a group represented by the formula —$COOR^7$, wherein $R^7$ is an alkyl group in which the number of carbon atoms is 1 to 4.

$R^{48}$ and $R^{49}$ are independently a hydrogen atom, or substituted or unsubstituted vinyl group represented by general formula (V):

$$—CR^{46}=CHR^{47} \quad (V)$$

wherein, $R^{46}$ and $R^{47}$ have the above-described meanings.

Further, v is a number of the repeating structures, which is specifically 2 or more.

Specific examples of the organic polyphosphinic acid metal salt include, for example, polyethylenephosphinic acid aluminum salt and the like.

As the auxiliary agent of component (C), aluminum hypophosphite and tris(diethylphosphinic acid) aluminum salt are particularly preferable.

An amount of component (C) blended in the flame retardant composition is not particularly limited. However, the amount is preferably 0.1 parts by mass or more, more preferably 0.5 parts by mass or more, further preferably 1 part by mass or more, and particularly preferably 2 parts by mass or more with respect to 100 parts by mass of a total amount of component (A) and component (B). In addition, the amount is preferably 30 parts by mass or lower, more preferably 20 parts by mass or lower, and particularly preferably 10 parts by mass or lower with respect to 100 parts by mass of a total amount of component (A) and component (B). When the amount is too small, it is unlikely to achieve an effect by adding it. When the amount is too large, a physical property of the thermoplastic resin composition may be deteriorated.

<Component (D)>

As the thermoplastic resin of component (D), any thermoplastic resin can be used.

Types of the thermoplastic resin include, for example, polyolefin resin, polyester-based resin, polyurethane-based resin, styrene-based resin, acryl-based resin, polycarbonate-based resin, polyamide-based resin and the like. The thermoplastic resin can be a homopolymer, and also can be a copolymer.

Specifically, the thermoplastic resin includes, for example, polypropylene, polystyrene, polyethylene, polyvinyl alcohol, polyvinyl acetate, polyvinyl acetal, polyvinyl butyral, ABS resin, AS resin, methacrylic resin, thermoplastic polyurethane resin, polycarbonate, polyamide and the like. Regarding these resins, it is possible to use one type of a resin alone, and it is possible to mix two or more types of resins and use the mixture.

The thermoplastic resin of component (D) is preferably a polyolefin resin, and more preferably polyethylene, polypropylene and a copolymer containing propylene or ethylene.

The types of polyethylene are not particularly limited. The polyethylene can be a high density polyethylene (HDPE), can be a linear low density polyethylene (LLDPE), can be a branched low density polyethylene (LDPE), and can be ultra high molecular weight polyethylene (UHMWPE).

The types of polypropylene are not particularly limited. The polypropylene can be isotactic polypropylene, can be syndiotactic polypropylene, and can be atactic polypropylene.

The copolymer containing propylene or ethylene can be a copolymer of propylene and another monomer, can be a copolymer of ethylene and another monomer, and can be a copolymer of propylene, ethylene and another monomer.

Regarding the copolymer, when a property of polyethylene is desired, a ratio of ethylene in the copolymer is preferably 10 mol % or more, more preferably 30 mol % or more, further preferably 50 mol % or more, and particularly preferably 70 mol % or more.

Regarding the copolymer, when a property of polypropylene is desired, a ratio of propylene in the copolymer is preferably 10 mol % or more, more preferably 30 mol % or more, further preferably 50 mol % or more, and particularly preferably 70 mol % or more.

Regarding the copolymer, when properties of both of polyethylene and polypropylene are desired, a ratio of a total amount of ethylene and propylene in the copolymer is preferably 10 mol % or more, more preferably 30 mol % or more, further preferably 50 mol % or more, and particularly preferably 70 mol % or more.

Regarding the copolymer, if necessary, it is possible to copolymerize a halogen-containing monomer (for example, vinyl chloride monomer). However, a halogen-containing monomer is not preferable from the viewpoint of environmental problems. Therefore, in a preferable embodiment, a copolymer does not comprise a halogen-containing monomer.

As the thermoplastic resin of component (D), a halogen-containing thermoplastic resin (for example, a polyvinyl chloride resin) can be also used. However, a halogen-containing thermoplastic resin is not preferable from the viewpoint of environmental problems. Therefore, in a preferable embodiment, the thermoplastic resin of component (D) does not comprise a halogen-containing thermoplastic resin.

In one embodiment, it is also possible to use, as the thermoplastic resin of component (D), a halogen-containing thermoplastic resin by mixing it with a thermoplastic resin containing no halogen. However, from the viewpoint of environmental problems, it is preferable that the amount of a halogen-containing thermoplastic resin is small. A content of a halogen-containing thermoplastic resin is preferably 30% by mass or lower, more preferably 10% by mass or lower, further preferably 5% by mass or lower, and particularly preferably 1% by mass or lower with respect to a total amount of the halogen-containing thermoplastic resin and a thermoplastic resin containing no halogen.

<Component (E)>

In the present invention, if necessary, as component (E), a dripping inhibitor can be used. As a dripping inhibitor of component (E), any known compound can be used. Specific examples of it includes, for example, fluorine resins such as polytetrafluoroethylene, polyhexafluoropropylene, and alkali metal salts of perfluoroalkane sulfonic acid such as potassium perfluorobutane sulfonate, sodium perfluorooctane sulfonate. It is possible to use a mixture of one or more of these. Above all, polytetrafluoroethylene (PTFE) has an excellent effect and is preferable.

<Flame Retardant Thermoplastic Resin Composition>

The flame retardant thermoplastic resin composition of the present invention can be obtained by mixing each of the components of the flame retardant composition and a thermoplastic resin. Regarding preparation of the flame retardant thermoplastic resin composition, it is possible to use a method wherein a step of mixing each of the components of the flame retardant composition is performed to prepare a flame retardant composition, and thereafter, the prepared flame retardant composition and a thermoplastic resin are mixed. It is also possible to use a method wherein a step of preparing a flame retardant composition is not performed and each of the components of the flame retardant composition and a thermoplastic resin are mixed.

An amount of component (A) which is blended in the thermoplastic resin composition is not particularly limited. However, the amount is preferably 6 parts by mass or more, more preferably 10 parts by mass or more, and particularly preferably 14 parts by mass or more with respect to 100 parts by mass of a total amount of component (A) to component (D). In addition, the amount is preferably 37 parts by mass or lower, more preferably 34 parts by mass or lower, further preferably 31 parts by mass or lower, still further preferably 28 parts by mass or lower, and particularly preferably 26 parts by mass or lower with respect to 100 parts by mass of a total amount of component (A) to component (D). When the amount is too small, it is unlikely to achieve an effect by adding it. When the amount is too large, a physical property of the thermoplastic resin composition may be deteriorated.

An amount of component (B) which is blended in the thermoplastic resin composition is not particularly limited. However, the amount is preferably 1 part by mass or more, more preferably 2 parts by mass or more, further preferably 3 parts by mass or more, and particularly preferably 5 parts by mass or more with respect to 100 parts by mass of a total amount of component (A) to component (D). In addition, the amount is preferably 15 parts by mass or lower, more preferably 14 parts by mass or lower, further preferably 13 parts by mass or lower, and particularly preferably 12 parts by mass or lower with respect to 100 parts by mass of a total amount of component (A) to component (D). When the amount is too small, it is unlikely to achieve an effect by adding it. When the amount is too large, a physical property of the thermoplastic resin composition may be deteriorated.

A total amount of the phosphate ester amide compound of component (A) and the nitrogen-containing compound of component (B) to be blended is preferably 1 part by mass or more, more preferably 5 parts by mass or more, further preferably 10 parts by mass or more, still further preferably 15 parts by mass or more, and particularly preferably 20 parts by mass or more with respect to 100 parts by mass of a total amount of component (A) to component (D). When a total amount of the phosphate ester amide compound of component (A) and the nitrogen-containing compound of component (3) to be blended is too small, there may be cases where a high flame retardancy is not achieved. In addition, a total amount of the phosphate ester amide compound of component (A) and the nitrogen-containing compound of component (B) to be blended is preferably 50 parts by mass or lower, more preferably 45 parts by mass or lower, further preferably 40 parts by mass or lower, still further preferably 35 parts by mass or lower, and particularly preferably 30 parts by mass or lower with respect to 100 parts by mass of a total amount of component (A) to component (D). When a total amount of the phosphate ester amide compound of component (A) and the nitrogen-containing compound of component (B) to be blended is too large, a physical property of the resin may be deteriorated.

An amount of component (C) which is blended in the thermoplastic resin composition is not particularly limited. However, the amount is preferably 0.1 parts by mass or more, more preferably 0.3 parts by mass or more, and particularly preferably 0.5 parts by mass or more with respect to 100 parts by mass of a total amount of component (A) to component (D). In addition, the amount is preferably 10 parts by mass or lower, more preferably 7 parts by mass or lower, further preferably 5 parts by mass or lower, and particularly preferably 3 parts by mass or lower with respect to 100 parts by mass of a total amount of component (A) to component (D). When the amount is too small, it is unlikely to achieve an effect by adding it. When the amount is too large, a physical property of the thermoplastic resin composition may be deteriorated.

An amount of component (E) which is blended in the thermoplastic resin composition is not particularly limited. However, it is preferably 0.03 parts by mass or more, more preferably 0.05 parts by mass or more, and further preferably 0.1 parts by mass or more, with respect to 100 parts by mass of a total amount of component (A) to component (D). In addition, the amount is preferably 2.0 parts by mass or less, and more preferably 1.0 part by mass or less with respect to 100 parts by mass of a total amount of component (A) to component (D). When the amount is too small, it is unlikely to achieve an effect by adding it. When the amount is too large, a physical property of the thermoplastic resin may be deteriorated.

<Other Flame Retardants>

If necessary, a flame retardant other than the flame retardant composition of the present invention can be used in the thermoplastic resin composition of the present invention. That is, a compound other than the above-described component (A), component (B) and component (C) which can provide a flame retardancy with a thermoplastic resin (hereinafter, referred to as "other flame retardant") can also be used in a thermoplastic resin composition.

For example, if necessary, an organic-type flame retardant other than the phosphoramidate compounds or an inorganic-type flame retardant can be used. Examples of the organic-type flame retardant other than the phosphoramidate compounds include a halogen-based flame retardant, a phosphate-based flame retardant, and the like. Examples of the inorganic flame retardant include an antimony compound, metal hydroxide, and the like. Specific examples of the metal hydroxide include, for example, aluminum hydroxide (alumina hydrate), magnesium hydroxide, and the like.

However, in order to take advantage of the flame retardant of the present invention, it is preferable that an amount of the other flame retardant to be used is small. For example, the amount of the other flame retardant to be used is preferably 20 parts by mass or less, more preferably 10 parts by mass or less, further preferably 5 parts by mass or less, still more preferably 1 part by mass or less with respect to 100 parts by mass of a thermoplastic resin. Further, for example, the amount of the other flame retardant to be used is preferably 100 parts by mass or less, more preferably 50 parts by mass or less, further preferably 20 parts by mass or less, and still more preferably 10 parts by mass or less with respect to 100 parts by mass of the flame retardant composition of the present invention.

In one preferable embodiment, the thermoplastic resin of the present invention does not comprise a halogen-based flame retardant. That is, it does not comprise a compound which has a halogen atom and can provide a flame retardancy to a thermoplastic resin.

In a particularly preferable embodiment, the other flame retardant is not mixed, and a flame retardant which consists of only component (A) and component (B) or a flame retardant which consists of only component (A), component (B) and component (C) is used.

The flame retardant of the present invention can achieve a high flame retardancy and various performances which are required for general thermoplastic resin products even if it is not mixed with the other flame retardant. Therefore, if the intended thermoplastic resin product is not a product for a special use, then it is not necessary to mix the thermoplastic resin composition of the present invention with the other flame retardant.

<Other Additives>

Further, various additives other than components (A) to (C) and (E) may be blended in the flame retardant thermoplastic composition of the present invention depending on the properties which are desired for the resin composition and within a range in which the effect of the present invention is not deteriorated. For example, an ultraviolet absorber, antioxidant, light stabilizer, coloring agent (for example, dye or pigment), surface modifier, antibacterial agent, insect repellent, antistatic agent, filler (for example, inorganic filler), reinforcing agent (for example, glass fiber reinforcing material), and the like can be added.

The types and amount to be added of these additives are not particularly limited, and an additive which is generally used can be used in a range of the amount which is generally used. Specifically, for example, for each of these additives, the amount can be 0.01 parts by mass or more, 0.1 parts by mass or more, or 1 part by mass or more with respect to 100 parts by mass of a thermoplastic resin. Further, the amount can be 20 parts by mass or less, and can be 10 parts by mass or less, or 5 parts by mass or less with respect to 100 parts by mass of a thermoplastic resin.

However, the aforementioned additives, such as coloring agent, cross-linking agent, ultraviolet absorber, hydrolysis inhibitor, filler, reinforcing material, and the like, are not always required for the thermoplastic resin composition of the present invention. It is enough as long as these additives are used for a thermoplastic resin composition in a minimum required amount based on required performances for an intended thermoplastic resin product.

<Method for Preparing a Composition>

The operations of mixing and stirring at the time of preparing the flame retardant composition or preparing the flame retardant thermoplastic resin composition can be performed by using a conventional stirring device, for example, a various mill, Henschel mixer (FM mixer) or the like. If the various components can be uniformly mixed, the order of the addition does not matter. It is possible that all of the components are put into a stirring device at once and they are mixed and stirred. Alternatively, it is possible to add the phosphate ester amide compound from a side feeder. In addition, it is possible that a masterbatch of a thermoplastic resin and a phosphate ester amide compound is prepared in advance, and a required amount of the masterebatch is blended to a thermoplastic resin, making into a necessary amount of a flame retardant in accordance with the flame retardant standard of the final product, to obtain a flame retardant resin composition having a desired flame retardancy.

In addition, it is also possible that when heat-melting molding of a thermoplastic resin (for example, injection molding or extrusion molding) is performed, a flame retardant is mixed with a thermoplastic resin to obtain a flame retardant resin composition.

<Molded Product>

The flame retardant thermoplastic resin composition of the present invention can be molded by any method which is known as a method of molding a thermoplastic resin. If a molding machine, a mold and the like which are suitable for the desired molded product are used, the desired molded product can be easily obtained. For example, various molded products such as automobile upholstery, packaging material, a material for electrical devices, a sheet or film for a building material, a material covering electric wire and the like can be molded. The molded product which is obtained has an advantage that it has an excellent flame retardancy and an excellent water-resistant property.

EXAMPLES

The present invention is described in further detail based on the following Examples. However, the present invention is not limited by the following Examples.

Synthesis Example 1

<Synthesis of the Compound of the Formula (4)>

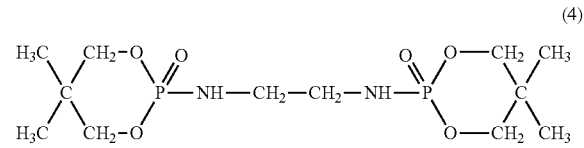

(4)

As the first step reaction, 312.6 g of neopentyl glycol (3.00 mol) and 109.5 g of 1,4-dioxane were charged in a 1 L four-necked flask equipped with a stirrer, a thermometer, a reflux tube connected to a hydrochloric-acid-recovering device, an aspirator, a dropping funnel, and a heating device. The resulting liquid was heated to 50° C. Subsequently, 460.5 g of phosphorus oxychloride (3.00 mol) was added thereto over 2 hours while the reaction temperature was maintained at 45 to 55° C. After the completion of addition, generated hydrochloric acid was collected while the mixture was further stirred at 80° C. for 1 hour, followed by dehydrochlorination at 80° C. at a reduced pressure of 80 kPa for 3 hours to thereby obtain 662.8 g of a white slurry.

As the second step reaction, 443.4 g of the white slurry which was obtained in the above-described first step reaction and 370.2 g of 1,4-dioxane were charged in a 2 L four-necked flask equipped with a stirrer, a thermometer, a dropping funnel, and a water bath. While the reaction temperature was maintained at 30° C., 72.3 g (1.20 mol) of ethylenediamine was added over 2 hours, and after the completion of the addition, it was further stirred at 30° C. for 2 hours. Then, 24% by mass of sodium hydroxide aqueous solution 364.2 g (2.19 mol) was added over 4.5 hours while the reaction temperature was maintained at 20 to 30° C. The obtained white slurry was filtered. A step of performing 30-minute repulp washing using water with the same mass as that of the filter cake and filtration was repeated until the filtrate was made neutral. The obtained solid was dried at 80° C. under 2.7 kPa for 8 hours to obtain 301.1 g (70.4% yield) of a product in which compound (4) is a main component. Phosphorus content percentage: 17.1% by mass. Nitrogen content percentage: 7.8% by mass. The obtained product was pulverized to powder having an average particle diameter of 20 μm or lower. The obtained powder was used in the following Examples.

Comparative Synthesis Example 1

<Synthesis of the Compound of the Formula (12)>

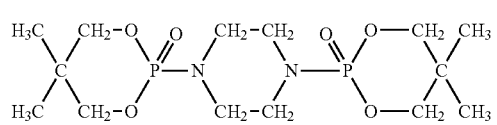

(12)

100.6 g of the white slurry obtained above in the first step reaction of the above-described Synthesis Example 1 and 214.3 g of 1,4-dioxane were charged in a 1 L four-necked flask equipped with a stirrer, a thermometer, a dropping funnel, and a water bath. While the reaction temperature was maintained at 30 to 40° C., 61.8 g of triethylamine (0.61 mol) was added thereto over 30 minutes. Subsequently, 23.4 g of piperazine (0.27 mol) was gradually added thereto over 2 hours. After the completion of addition, the resulting liquid was stirred at 40° C. for 4 hours. Then, 169.3 g of water was added to this reaction slurry, and it was stirred for 30 minutes, followed by filtration. Thereafter, a step of performing 30-minute repulp washing using water with the same mass as that of the filter cake and filtration was repeated until the filtrate was made neutral. The obtained solid was dried at 80° C. under 2.7 kPa for 8 hours to obtain 77.1 g (74% yield) of a product in which compound (12) is a main component. Phosphorus content percentage: 15.6% by mass. Nitrogen content percentage: 7.5% by mass. The obtained product was pulverized to powder having an average particle diameter of 20 μm or lower. The obtained powder was used in the following Comparative Examples.

[Average Particle Diameter]

Regarding the average particle diameter of the compounds of the Synthesis Example 1 and Comparative Synthesis Example 1, the measurement was performed by using a laser diffraction particle size distribution measurement device (SALD (registered trade mark) 2300 made by Shimadzu Corporation).

Example 1

The phosphate ester amide compound powder which was obtained in Synthesis Example 1 and melamine polyphosphate (PMP-100 made by Nissan Chemical Industry) were mixed in the ratio which is shown in Table 1A to obtain a flame retardant composition. Then, the flame retardant composition and a polypropylene resin (Prime Polypro (registered trade mark) J-750HP, made by Prime Polymer), and a dripping inhibitor were mixed such that the parts by mass are as shown in Table 1A.

Thereafter, a kneading step was performed using a twin-screw kneader at 180° C. to obtain a strand. The obtained strand was pelletized by a pelletizer to obtain pellets.

The obtained pellets were dried at 80° C. for 8 hours. Thereafter, a heated press machine was used to mold 42 g of the pellets into a shape of a sheet. The pellets were put into a mold (length 260 mm×width 200 mm×thickness 0.5 mm) of the heated press machine. The mold was maintained at 175° C. for 3 minutes under a condition where a pressure was not applied. Thereafter, while the temperature of 175° C. was maintained, the pressure was gradually increased to 15 MPa at a pressurizing rate of 5 MPa/0.5 min. Thereafter, immediately, the pressure was lowered to the normal pressure (0.1 MPa), and the molded product was transferred to a cooling press machine. Thereafter, a pressure of 5 MPa was applied again to perform a cooling press step, and the molded product was cooled to the room temperature. Thereafter, a sheet (length 260 mm×width 200 mm×thickness 0.5 mm) was removed from the mold.

In addition, an injection molding machine (FN2000 made by Nissei Plastic Industrial) was used to mold pellets at a molding temperature of 180° C. to produce a predetermined shape of test pieces in accordance with UL-94.

Examples 2 and 3

A sheet and test piece were obtained similarly to Example 1, with the proviso that in place of the flame retardant composition which was used in Example 1, melamine pyrophosphate (BUDIT351 made by Budenheim) (molecular formula: $C_6H_{16}N_{12}O_7P_2$, the molar ratio of pyrophosphoric acid:melamine=1:2), or melamine phosphate (Melagard (registered trade mark) MP made by Italmatch Chemicals) (molecular formula: $C_3H_9N_6O_4P$, the molar ratio of phosphoric acid:melamine=1:1) was used in the parts by mass as shown in Table 1B.

Comparative Examples 1 to 3

A sheet and test piece were obtained similarly to Example 1, with the proviso that in place of the flame retardant composition which was used in Example 1, ammonium polyphosphate (Exolit (registered trade mark) AP422 made by Clariant), piperazine poly(pyro) phosphate, a homopolymer whose constituent is 2-piperazinylene-4-morpholino-1,3,5-triazine, and melamine cyanurate were used in the parts by mass as shown in Table 1A.

<Water-Resistant Property Test Method>

From each of the polypropylene sheets (length 100 mm×width 50 mm×thickness 0.5 mm) of Examples 1 to 3 and Comparative Examples 1 to 3, two specimens were prepared. A high temperature high humidity test of 80° C.×95 RH %×7 days was performed. The surfaces of the films after the tests were observed visually, and thereby the presence/absence of occurrence of a pinhole was confirmed. In addition, the films after the test were washed with 70 mL of purified water. The washing water was decomposed with a nitric acid. Thereafter, a phosphorus concentration was measured by ICP emission spectroscopic analysis, and an average value of the phosphorus concentrations of the two specimens was calculated and used as an index of the amount of the phosphorus compound eluted into the washing water. The measurement of ICP emission spectroscopic analysis was performed using an iCAP6000 series ICP emission spectrometer analysis device made by Thermo Fisher Scientific.

The results of the water-resistant property test are shown in Table 1A and Table 1B. It should be noted that the blending amounts in Table 1A and Table 1B are all based on parts by mass.

TABLE 1A

|  | Example 1 | Comparative Example 1 | Comparative Example 2 | Comparative Example 3 |
|---|---|---|---|---|
| PP (Prime Polypro J-750HP) | 70 | 70 | 70 | 70 |
| Phosphate ester amide (Formula 4) | 20 | | | |
| Ammonium polyphosphate | | 22.5 | | |
| Piperazine pyrophosphate | | | 18 | 19.5 |
| Melamine polyphosphate | 10 | | 12 | |
| Homopolymer whose constituent is 2-piperazinylene-4-morpholino-1,3,5-triazine [Cas. No. 93058-67-4] | | 7.5 | | |
| Melamine cyanurate | | | | 10.5 |
| Dripping inhibitor (PTFE) | 0.2 | 0.2 | 0.2 | 0.2 |
| UL-94 combustion test (1/16 inches) | V-0 | V-0 | V-0 | V-0 |
| Phosphorus elution concentration (PPM) | 0.68 | 94.66 | 874.1 | 572.5 |
| Surface of specimens after the test | No change | There are pinholes. | There are pinholes. | There are pinholes. |

TABLE 1B

|  | Example 2 | Example 3 |
|---|---|---|
| PP (Prime Polypro J-750HP) | 70 | 70 |
| Phosphate ester amide (Formula 4) | 20 | 20 |
| BUDIT351 | 10 | |
| Melagard MP | | 10 |
| Dripping inhibitor (PTFE) | 0.2 | 0.2 |
| Phosphorus elution concentration (PPM) | 0.55 | 1.67 |
| Surface of specimens after the test | No change | No change |

From Table 1A and Table 1B, it is understood that regarding the polypropylene sheets of Examples 1 and 2 which contain the phosphate ester amide compound and the nitrogen-containing compound having a 1,3,5-triazine structure, the amount of phosphorus elution was 1.0 ppm or lower under the conditions of the high temperature and high humidity, there is no change of surfaces of the sheet specimens before and after the test, and they have an excellent water-resistant property. Similarly, regarding the polypropylene sheet of Example 3, it is clear that an excellent water-resistant property is exhibited. On the other hand, in Comparative Examples 1, 2 and 3, the amount of elution of phosphorus compound from the polypropylene sheet was large, and pinholes were formed in the surface of the sheet specimens. Therefore, it is understood that in the resin composition of Comparative Examples 1, 2 and 3, the water-resistant property is low. Therefore, it is understood that it is difficult to use the formulations of Comparative Examples 1, 2 and 3 in a field which requires a water-resistant property.

[Flame Retardancy Test]

The flame retardancy test was performed in accordance with the vertical test combustion method of "Test for flammability of plastic materials for parts in devices and appliances" of UL subject 94 (Underwrighters Laboratories Incorporated). Regarding the wall thickness of the test piece, 1.6 mm (1/16 inches) was used.

[Oxygen Index]

The measurement of oxygen indices (L.O.I) was performed in accordance with Japan Industrial Standard JIS K7201 (Test method of flammability based on oxygen index).

[Impact Resistance Strength Test]

The measurement was performed in accordance with Japan Industrial Standard JIS K7110 (Method of izod impact test of hard plastic material).

[Distortion Temperature Under Load]

The measurement of the distortion temperature under load (I-IDT) was performed in accordance with Japan Industrial Standard JIS K7191 (Method for obtaining distortion temperature under load).

Examples 4 to 13 and Comparative Examples 4 to 8

The polypropylene resin (Prime Polypro (registered trade mark) J-750HP) and the phosphate ester amide compound of Synthesis Example 1 or Comparative Synthesis Example 1 were mixed in the blending amounts shown in Table 2A and Table 2B. Thereafter, if necessary, zinc oxide or aluminum hypophosphite was added. Thereafter, a dripping inhibitor (teflon-6J) was added. They were sufficiently mixed and they were made uniform. Thereafter, a kneading step was performed by using a twin-screw kneading extruder (TEM-37BS made by Toshiba machine) at 180° C., and it was cooled to obtain a strand. The obtained strand was pelletized by a pelletizer to obtain pellets. The pellets were dried at 80° C. for 8 hours. Thereafter, an injection molding machine (FN2000 made by Nissei Plastic Industrial) was used to mold pellets at a molding temperature of 180° C. to produce predetermined test pieces. The obtained test pieces were used to perform a combustion test, oxygen index measurement, impact resistance test, and distortion test under load, respectively. The results are shown in Table 2A and Table 2B. It should be noted that the blending amounts in Table 2A and Table 2B are all based on parts by mass.

Example 14

A sheet and test piece were obtained similarly to Example 1, with the proviso that in place of the flame retardant composition which was used in Example 1, tris(diethylphosphinic acid) aluminum salt (trade name: Exolit OP-1230 made by Clariant) was used in the parts by mass as shown in Table 2B.

TABLE 2A

| | Examples | | | | | | |
|---|---|---|---|---|---|---|---|
| | 4 | 5 | 6 | 7 | 8 | 9 | 10 |
| Polypropylene resin | 70 | 70 | 70 | 74 | 71 | 76 | 74 |
| Phosphate ester amide (Formula 4) | 20 | 20 | 24 | 17.3 | 18.7 | 14.7 | 17.3 |
| Phosphate ester amide (Formula 12) | | | | | | | |
| Melamine polyphosphate BUDIT351 | 10 | 10 | 6 | 8.7 | 9.3 | 7.3 | |
| Melagard MP | | | | | | | 8.7 |
| Piperazine pyrophosphate | | | | | | | |

TABLE 2A-continued

| | Examples | | | | | | |
|---|---|---|---|---|---|---|---|
| | 4 | 5 | 6 | 7 | 8 | 9 | 10 |
| Aromatic condensed phosphate ester | | | | | | | |
| Metal oxide (zinc oxide) | | | | | 1 | | |
| Metal salt (aluminum hypophosphite) | | | | | | 2 | |
| PTFE | 0.4 | 0.4 | 0.2 | 0.2 | 0.2 | 0.2 | 0.2 |
| HDT (0.46 MPa) (° C.) | 121.6 | 129.7 | 131.0 | 128.3 | 131.1 | 126.8 | 120.7 |
| MFR (190° C., 2.16 kg) (g/10 min) | 2.5 | 0.5 | 0.8 | 1.4 | 1.5 | 1.9 | 1.7 |
| Izod (1/8") (J/m) | 32 | 26 | 30 | 35 | 30 | 35 | 36 |
| Izod (1/4") (J/m) | 26 | 26 | 23 | 35 | 29 | 37 | 40 |
| UL-94 (1/16") | V-2 | V-0 | V-0 | V-0 | V-0 | V-0 | V-1 |
| L.O.I. | 30.7 | 32.5 | 33.8 | 29.4 | 31.6 | 30.3 | 30.3 |

TABLE 2B

| | Examples | | | | Comparative Examples | | | | |
|---|---|---|---|---|---|---|---|---|---|
| | 11 | 12 | 13 | 14 | 4 | 5 | 6 | 7 | 8 |
| Polypropylene resin | 74 | 74 | 76 | 74 | 77 | 70 | 70 | 70 | 76 |
| Phosphate ester amide (Formula 4) | 17.3 | 16 | 14.7 | 16 | | | 20 | | |
| Phosphate ester amide (Formula 12) | | | | | | | | 20 | 14.7 |
| Melamine polyphosphate BUDIT351 | | | | | | 30 | | 10 | |
| Melagard MP | 8.7 | 8 | 7.3 | 8 | | | | | 7.3 |
| Piperazine pyrophosphate | | | | | | | 10 | | |
| Aromatic condensed phosphate ester | | | | 23 | | | | | |
| Metal oxide (zinc oxide) | | | | | | | | | |
| Metal salt (aluminum hypophosphite) | | 2 | 2 | | | | | | 2 |
| Metal salt (tris (diethylphosphinic acid) aluminum salt) | | | | 2 | | | | | |
| PTFE | 0.2 | 0.2 | 0.2 | 0.2 | 0.2 | | 0.1 | 0.2 | 0.2 |
| HDT (0.46 MPa) (° C.) | 130.3 | 126.6 | 124.2 | 125.8 | Unable to mold (Note[1]) | — | 127.7 | 126.7 | 121.2 |
| MFR (190° C., 2.16 kg) (g/10 min) | 1.9 | 2.2 | 2.1 | 2.8 | | — | 4.4 | 1.1 | 2.1 |
| Izod (1/8") (J/m) | 37 | 35 | 39 | 41 | | — | 24 | 13 | 27 |
| Izod (1/4") (J/m) | 37 | 33 | 38 | 41 | | — | 22 | 20 | 29 |
| UL-94 (1/16") | V-1 | V-0 | V-1 | V-0 | | all burn | all burn | all burn | all burn |
| L.O.I. | 28.9 | 31.6 | 31.1 | 30.3 | 18.9 | 27.6 | 30.7 | 28.1 | |

Note[1]:
In Comparative Example 4, bleeding-out was critical and therefore it was impossible to perform a molding step.

The flame retardant composition of the present invention can provide a high flame retardancy. For example, the composition which comprises the phosphate ester amide compound described in the formula (4) and the nitrogen-containing compound having a 1,3,5-triazine structure resulted in a high flame retardancy (Examples 4 to 14). In addition, even when the amount of addition was reduced, a high flame retardancy was achieved (Example 7).

Even if a dripping inhibitor is not used, the flame retardant composition of the present invention can provide a flame retardancy (Example 4). Further, the composition in which a dripping inhibitor was added achieved UL-94 (V-0 or V-1) even when a test piece having a small thickness was used.

In addition, when the metal oxide or metal salt of component (C) was added as an auxiliary agent, the flame retardancy was further improved by the synergistic effect (Examples 8, 9, and 12 to 14).

On the other hand, when the aromatic condensed phosphate ester (tetrakis(2,6-dimethylphenyl)-m-phenylene bisphosphate) was blended with the polypropylene resin, a bleeding-out phenomenon was critical and as a result, it was impossible to obtain a test piece (Comparative Example 4). In the case when only the melamine polyphosphate was blended with the polypropylene resin and in the case when the phosphate ester amide and piperazine pyrophosphate were blended with the polypropylene resin, it was impossible to achieve a sufficient flame retardant effect (Comparative Examples 5 and 6).

It should be noted that the phosphate ester amide compound represented by the formula (12) is disclosed in Japanese Laid-open Publication No. 2003-226818 and US2003/0109608 and is described as effective in providing a flame retardancy to a polyester-based resin (PBT). When the phosphate ester amide compound represented by the formula (12) is used in a polypropylene resin, although the phosphate ester amide compound and melamine polyphosphate were used in combination and total 30 parts by mass were added, it was impossible to achieve a sufficient flame retardant effect (Comparative Example 7).

Further, even though the phosphate ester amide compound and melamine phosphate were used in combination, it was impossible to achieve sufficient flame retardant effect (Comparative Example 8).

From the comparison of the results of Example 13 and Comparative Example 8, it was made clear that also in the composition comprising component (C), the compound of the formula (4) is significantly superior to the compound of the formula (12).

INDUSTRIAL APPLICABILITY

According to the present invention, a flame retardant thermoplastic resin composition which has a high flame retardant effect and has an excellent water-resistant property is provided. In addition, a non-halogen-based flame retardant composition which is to be used in the flame retardant thermoplastic resin composition is provided. The flame retardant and the resin composition according to the present invention can be used in molded products such as an automobile upholstery, a packaging material, a material for electrical devices, a sheet or film for building materials, a material covering electric wire and the like. In particular, the flame retardant composition and the resin composition are useful in molded products for a use which requires both water-resistant property and a flame retardancy.

The present invention has been exemplified so far with reference to the favorable embodiments of the present invention, but it should not be construed that the present invention is restricted by the embodiments. It is understood that the scope of the present invention should be construed only by the claims. It is understood that those who are skilled in the art can carry out an equivalent range based on the description of the present specification and technical common sense from the description of the specific favorable embodiments of the present invention. It is understood that the contents of the patents, patent applications and literatures cited in the present specification should be herein incorporated by reference, similarly to the case where the contents themselves are described specifically in the present specification.

The invention claimed is:

1. A flame retardant composition comprising component (A) and component (B), wherein,
the component (A) is a phosphate ester amide compound represented by the following general formula (I):

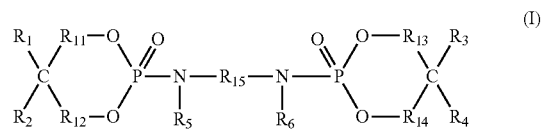

wherein, $R_1$, $R_2$, $R_3$ and $R_4$ are each independently a hydrogen atom or an alkyl group in which the number of carbon atoms is 1 to 3, $R_{11}$, $R_{12}$, $R_{13}$ and $R_{14}$ are each independently an alkylene group in which the number of carbon atoms is 1 to 3, $R_{15}$ is an alkylene group in which the number of carbon atoms is 1 to 6, and $R_5$ and $R_6$ are each independently a hydrogen atom or an alkyl group in which the number of carbon atoms is 1 to 6, and
the component (B) is a melamine phosphate, melamine pyrophosphate or melamine polyphosphate.

2. The flame retardant composition according to claim 1, wherein a value of a blending ratio (A)/(B) (mass ratio) of the component (A) and component (B) is larger than 1.

3. The flame retardant composition according to claim 1, wherein, in the general formula (I), $R_1$, $R_2$, $R_3$ and $R_4$ are each a methyl group, and $R_{11}$, $R_{12}$, $R_{13}$ and $R_{14}$ are each a methylene group.

4. The flame retardant composition according to claim 1, wherein in the general formula (I), $R_{15}$ is an ethylene group.

5. The flame retardant composition according to claim 1, wherein in the general formula (I), $R_5$ and $R_6$ are each a hydrogen atom.

6. The flame retardant composition according to claim 1, wherein the component (B) is a melamine polyphosphate.

7. The flame retardant composition according to claim 1, wherein the component (B) is a melamine pyrophosphate.

8. The flame retardant composition according to claim 1, wherein the component (B) is a melamine phosphate.

9. The flame retardant composition according to claim 1, further comprising component (C) which is a metal oxide or a metal salt.

10. The flame retardant composition according to claim 9, wherein the component (C) is aluminum hypophosphite.

11. The flame retardant composition according to claim 9, wherein the component (C) is an organic phosphinic acid metal salt, organic diphosphinic acid metal salt or organic polyphosphinic acid metal salt.

12. The flame retardant composition according to claim 1, wherein a blending ratio (mass ratio) (A)/(B) of the component (A) and component (B) is 1.3 to 5.

13. A flame retardant thermoplastic resin composition comprising the flame retardant composition according to claim 1 and component (D) which is a thermoplastic resin.

14. The flame retardant thermoplastic resin composition according to claim 13, wherein a total amount of the component (A) and component (B) is 10 parts by mass to 50 parts by mass with respect to 100 parts by mass of a total amount of the component (A) to component (D).

15. The flame retardant thermoplastic resin composition according to claim 13, further comprising component (E) which is a dripping inhibitor.

16. The flame retardant thermoplastic resin composition according to claim 15, wherein the dripping inhibitor of the component (E) is polytetrafluoroethylene.

17. The flame retardant thermoplastic resin composition according to claim 13, wherein the thermoplastic resin of the component (D) is a polyolefin resin.

18. The flame retardant thermoplastic resin composition according to claim 17, wherein the polyolefin resin is polypropylene, polyethylene, or a copolymer comprising propylene or ethylene.

* * * * *